(12) United States Patent
MacNeil et al.

(10) Patent No.: US 10,717,396 B2
(45) Date of Patent: Jul. 21, 2020

(54) VEHICLE CUP HOLDER CELL PHONE MOUNT

(71) Applicant: MACNEIL IP LLC, Bolingbrook, IL (US)

(72) Inventors: David F. MacNeil, Fort Lauderdale, FL (US); David S. Iverson, Oak Brook, IL (US)

(73) Assignee: MACNEIL IP LLC, Bolingbrook, IL (US)

( * ) Notice: Subject to any disclaimer, the term of this patent is extended or adjusted under 35 U.S.C. 154(b) by 0 days.

(21) Appl. No.: 16/172,826

(22) Filed: Oct. 28, 2018

(65) Prior Publication Data
US 2020/0130604 A1 Apr. 30, 2020

(51) Int. Cl.
| H04M 1/00 | (2006.01) |
| B60R 11/02 | (2006.01) |
| H04M 1/04 | (2006.01) |
| B60R 11/00 | (2006.01) |

(52) U.S. Cl.
CPC .......... *B60R 11/0241* (2013.01); *H04M 1/04* (2013.01); *B60R 2011/005* (2013.01); *B60R 2011/0007* (2013.01); *B60R 2011/0071* (2013.01); *B60R 2011/0075* (2013.01)

(58) Field of Classification Search
CPC ......... B60R 11/0241; B60R 2011/0007; B60R 2011/005; B60R 2011/0071; B60R 2011/0075; H04M 1/04
USPC ..................................... 248/311.2; 455/569.1
See application file for complete search history.

(56) References Cited

U.S. PATENT DOCUMENTS

| D247,548 S | 3/1978 | Crary |
| D289,898 S | 5/1987 | Miller |
| D309,307 S | 7/1990 | Sigurdson |
| 5,174,534 A | 12/1992 | Mitchell |

(Continued)

FOREIGN PATENT DOCUMENTS

CN 106427807 2/2017

OTHER PUBLICATIONS amazon.com, website, image of Belkin Car Cup Holder for Smartphones, downloaded on Jan. 17, 2019.

(Continued)

*Primary Examiner* — Huy C Ho
(74) *Attorney, Agent, or Firm* — Perkins IP Law Group LLC; Jefferson Perkins

(57) ABSTRACT

A vehicle cup holder cell phone mount has a base with a downwardly and inwardly tapering surface of rotation around a vertical axis. A pier stands up from a top of the base and a cell phone mounting bracket is pivotally mounted to the pier. The cell phone mounting bracket has adjustable jaws to fit cell phones of varying widths. The jaws always define an opening for a cell phone power/communications cable. One or more of a plurality of shells may be selectively assembled to the base. Each shell has a tapering surface of rotation around the axis. The shells are of different sizes. The user assembles from zero to (n) shells to the base, Russian-doll fashion, so as to optimally fit a particular vehicle cup holder. The user then wedges the assembly into the vehicle cup holder such that compressive force between the outermost tapering surface and the cup holder side wall securely holds the cell phone mount in place in the vehicle cup holder.

6 Claims, 19 Drawing Sheets

(56) References Cited

U.S. PATENT DOCUMENTS

| | | | |
|---|---|---|---|
| 5,285,938 A | 2/1994 | Fauchald | |
| 5,285,953 A | 2/1994 | Smith | |
| 5,676,340 A | 10/1997 | Ruhnau | |
| 5,745,565 A | 4/1998 | Wakefield | |
| D400,763 S | 11/1998 | Taylor et al. | |
| D402,666 S | 12/1998 | Golder | |
| D407,408 S | 3/1999 | Hoff | |
| 5,897,041 A | 4/1999 | Ney et al. | |
| 6,019,325 A | 2/2000 | Dotson et al. | |
| 6,062,518 A | 5/2000 | Etue | |
| D439,116 S | 3/2001 | White | |
| 6,246,766 B1 | 6/2001 | Walsh | |
| 6,253,982 B1 | 7/2001 | Gerardi | |
| 6,267,340 B1 | 7/2001 | Wang | |
| 6,315,153 B1 | 11/2001 | Osborn | |
| D451,504 S | 12/2001 | Edwards | |
| D452,236 S | 12/2001 | Kohli | |
| D475,044 S | 5/2003 | Kohli et al. | |
| 7,099,466 B2 | 8/2006 | Walsh | |
| 7,099,467 B1 | 8/2006 | Rohrbach | |
| 7,140,586 B2 * | 11/2006 | Seil | B60R 11/00 248/311.2 |
| D558,769 S | 1/2008 | Krieger et al. | |
| 7,708,247 B2 | 5/2010 | Lota | |
| D625,715 S | 10/2010 | Adams, II | |
| 8,061,670 B1 * | 11/2011 | White | B60N 3/10 248/309.1 |
| D655,282 S | 3/2012 | Richter | |
| D654,119 S | 7/2012 | Lin | |
| D705,211 S | 5/2014 | Huang | |
| D709,066 S | 7/2014 | Byun | |
| D718,298 S | 11/2014 | Aspinall et al. | |
| 8,922,354 B2 | 12/2014 | Nagara et al. | |
| 9,079,545 B2 | 7/2015 | Dugan | |
| 9,161,466 B2 | 10/2015 | Huang | |
| 9,162,630 B2 * | 10/2015 | Pluta | B60R 11/02 |
| 9,254,793 B2 | 2/2016 | Won | |
| D771,614 S | 11/2016 | Chang | |
| D777,720 S | 1/2017 | Russell | |
| 9,573,532 B2 | 2/2017 | Riddiford et al. | |
| 9,698,851 B2 | 7/2017 | Andrus | |
| 9,758,248 B2 | 9/2017 | Procter et al. | |
| D799,469 S | 10/2017 | Esses | |
| 9,821,723 B2 | 11/2017 | Mannarino | |
| D807,701 S | 1/2018 | Bo | |
| 9,900,417 B1 | 2/2018 | Ruiz | |
| D817,317 S | 5/2018 | Lee | |
| D823,062 S | 6/2018 | Goodwin et al. | |
| 9,987,993 B2 | 6/2018 | Thorimbert | |
| D832,248 S | 10/2018 | Sukphist et al. | |
| D833,369 S | 11/2018 | Lan | |
| D835,113 S | 12/2018 | Kim | |
| 10,155,482 B2 | 12/2018 | Corso | |
| D848,412 S | 5/2019 | Greve et al. | |
| D848,443 S | 5/2019 | Yao et al. | |
| 10,284,250 B2 | 5/2019 | Andrus | |
| 10,315,585 B2 | 6/2019 | Minn et al. | |
| D859,395 S | 9/2019 | Yao et al. | |
| 2002/0049081 A1 | 4/2002 | Heininger | |
| 2002/0094078 A1 | 7/2002 | Edwards | |
| 2014/0176062 A1 | 6/2014 | Jung | |

OTHER PUBLICATIONS amazon.com, website, image of Custom Accessories 23384 Heavy Cup Mount Magnetic Phone Holder, downloaded on Jan. 17, 2019.

amazon.com, website, 17, 2019 image of Macally Adjustable Automobile Cup Holder Phone Mount, downloaded on Jan. 17, 2019.

amazon.com, website, image of Mediabridge Smartphone Cradle w/Extended Cup Holder Mount, downloaded on Jan. 17, 2019.

amazon.com, website, image of NNDA CO Universal Adjustable Gooseneck Cup Holder Cradle Car Mount for Phone, downloaded on Jan. 17, 2019.

amazon.com, website, image of Sunjoyco Car Cup Holder Mount for Phone Tablet, 2-in-1 Car Cradles Adjustable Gooseneck Holder, downloaded on Jan. 17, 2019.

amazon.com, website, image of Tackform Solutions Car Phone Holder Magnetic Mount, downloaded on Jan. 17, 2019.

amazon.com, website, image of TNP Cup Holder Phone Mount, Universal Car Cup Smartphone Cradle Clamp w/Flexible Neck, downloaded on Jan. 17, 2019.

amazon.com, website, image of USA Gear Cup Holder Suction Mount Surface Adapter, downloaded on Jan. 17, 2019.

crutchfield.com, website, image of BRACKETRON BT 16572 PhabGrip cup holder mount, downloaded on Jan. 17, 2019.

HDAccessory.com, website, image of Universal Smartphone Cup Holder Mount, downloaded on Jan. 17, 2019.

stacksocial.com, website, image of U-Grip Cup Holder Car Mount for Phones and Tablets, downloaded on Jan. 17, 2019.

walmart.com, website, image of Universal Adjustable Gooseneck Cup Holder Cradle Car Mount for Cell Phone, downloaded on Jan. 17, 2019.

rakuten.com, website, image of Smartphone 8" Long Car Cup Holder, IKross Phone Mount, downloaded on Jan. 17, 2019.

Macally Cell Phone Cup Holder for Car Mount, Amazon.com, Date First Available: Jun. 29, 2017, [online], [site visited Oct. 24, 2019]. <URL: https://www.amazon.com/Macally-Samsung-Motorola-Smartphones-MCUP/dp/B002JTWRN8> (Year:2017).

Cellet PH600 Car Cup Holder Mount, Amazon.com, [online], [site visited Oct. 24, 2019]. <URL: https://www.amazon.com/dp/B006BIQBMQ/ref=psdc_2230642011_t4_B002JTWRN8>(Year: 2019).

10 Cup Holder Phone Mount Reviews for 2019, HotRate.com, by Joey Randall, Last Updated Jan. 25, 2019, [online], [site visited Oct. 24, 2019]. <URL: https://www.hotrate.com/electronics/cup-holder-phone-mount/> (Year: 2019).

* cited by examiner

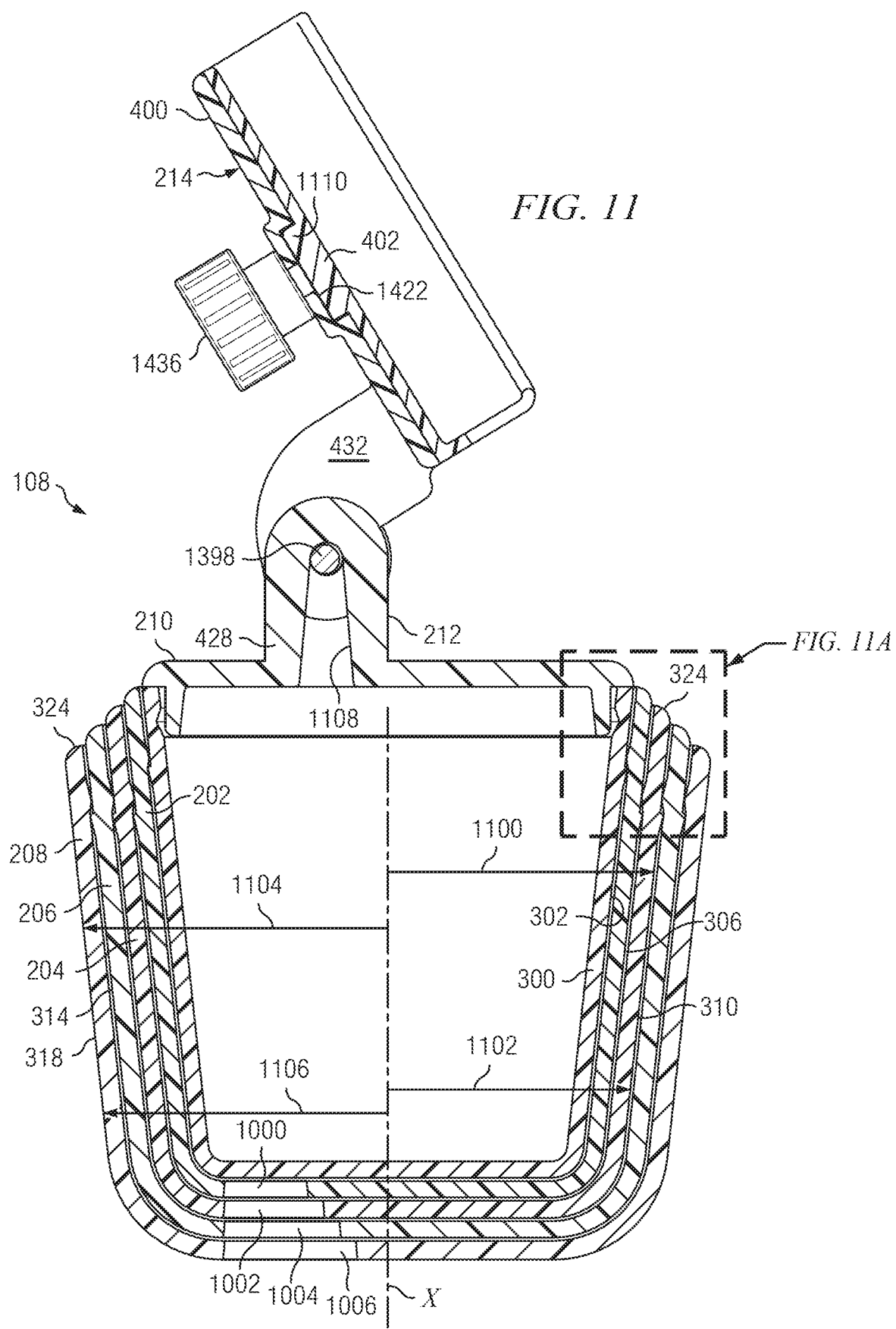

VEHICLE CUP HOLDER CELL PHONE MOUNT

BACKGROUND OF THE INVENTION

Within the last two decades, cellular telephones ("cell phones") have become ever more popular as their abilities have increased. In addition to being telephones, the now-common "smart phone" is a personal data assistant, a screen for photos and videos, an Internet browser, a text messager, a music player, an email portal, a method of payment, a map, a direction finder, a scanner, a camera and many other things. Because of their expanded functions, it has become common for people to carry their cell phones all of the time. Since for many people much of their day is spent inside of a vehicle, cell phone mounts have been developed that attach the cell phone to various locations in the vehicle interior, such as to the windshield, to a heating/air conditioning vent or to a cup holder.

Vehicle cup holders are now almost universally provided in vehicles, but they do not come in a uniform size. Vehicle cup holders typically are cylindrical or nearly so, so as to accommodate a variety of sizes of cans, bottles and cups, but their radii from a central axis significantly differ from one make of vehicle to another. Some vehicle cup holders further have inwardly projecting fingers meant to grip the sides of a beverage container. A successful cup holder cell phone mount will have a means to adjust it to fit any of a range of cup holder sizes, but at the same time should be inexpensive to manufacture and should be easy for an end user to deploy. The cup holder cell phone mount also should have a means for holding cell phones of different widths and for adjusting the angle of the cell phone screen for optimum viewing, and once installed should resist coming loose as a result of vibration, vehicle acceleration or deceleration or a vehicle change in direction.

SUMMARY OF THE INVENTION

According to one aspect of the invention, a vehicle cup holder cell phone mount is provided to mount a cell phone to any of a plurality of vehicle cup holders in a wide range of radial and depth sizes. The mount includes a base with a first outer surface preferably formed as a surface of rotation around a vertical axis. The first outer surface is generally downwardly and inwardly tapered. A cell phone holder is affixed to the top of the base. The mount also includes at least one hollow shell. A second outer surface of the shell is formed as a surface of rotation around the axis, and is generally inwardly and downwardly tapered. An inner surface of the shell, opposed to the second outer surface, may be releasably affixed to the first outer surface of the base.

In the illustrated embodiment, the user is provided with a plurality of shells in sequentially increasing radial sizes. To install the mount in a cup holder of a particular vehicle, the user ascertains the approximate radius or size of the vehicle cup holder. In some instances, the user will determine that he or she needs no shells at all, in which case none of the shells is assembled to the base and instead the base is directly press-fit into the vehicle cup holder. Otherwise, the user will select one of the shells as providing the best fit to the inner wall of the vehicle cup holder. This shell may be the first, second, third, fourth, etc. shell in a sequentially increasing range of sizes. The user affixes the first shell to the first surface of the base. If the first shell is the same as the selected shell, the user puts the other shells aside and press-fits the resulting base assembly into the vehicle cup holder. If the first shell is not the same as the selected shell, the user releasably affixes an inner surface of the second shell to the outer surface of the first shell. The user builds up the assembly in this fashion until the last shell assembled to the base assembly is the same as the selected shell. The user then press-fits the base assembly into the vehicle cup holder.

The base and shells of the mount are provided so as to fit a large range of vehicle cup holders. The vehicle cup holders vary in depth and diameter. Therefore, the dimensions of the outer surfaces of the base and shells are chosen such that a bottom of the base or a bottom of any employed shell will be spaced from a bottom of the vehicle cup holder. The degree of taper of the base outer surface and each of the shell outer surfaces is chosen to be greater than the range of taper or pitch encountered in the given range of vehicle cup holders. This dimensioning and specification of taper insure a tight and enduring frictional or interference fit between the employed base/shell outer surface and the vehicle cup holder inner side wall.

In another aspect of the invention, apparatus for mounting a cell phone to a vehicle cup holder has a base formed around an axis. A first outer surface of the base is adapted to be press-fit into a vehicle cup holder that falls within a predetermined range of sizes. A mounting pier extends upwardly from a top of the base. A cell phone mounting bracket is rotatably affixed to the pier and has first and second jaws. The first jaw has a first u-shaped channel with a first upper segment. The second jaw has a second u-shaped channel with a second upper segment, disposed in parallel and spaced from the first upper segment. The second jaw is movable with the respect to the first jaw so that a width, taken perpendicularly to the axis, between the first upper segment and the second upper segment may be adjustable by a user so as to fit a width of the cell phone to be mounted. Means are provided to affix the second jaw relative to the first jaw in any of a plurality of positions.

The first u-shaped channel further has a first lower segment and the second u-shaped channel has a second lower segment. The first and second lower segments are aligned with each other and are disposed in a plane perpendicular to the base axis. The first and second lower segments are adapted to hold a lower end of the cell phone. In one embodiment, there is a space in between a first inner end of the first lower segment and a second inner end of the second inner segment, even when the second jaw is moved to the closest position that it can take relative to the first jaw. The first and second inner ends define an access hole or opening between them, for a cell phone power/communications cable such as a firewire cable. Such cables are plugged into a port in a bottom edge of the cell phone.

BRIEF DESCRIPTION OF THE DRAWINGS

Further aspects of the invention and their advantages can be discerned in the following detailed description as read in conjunction with the drawings of exemplary embodiments, in which like characters denote like parts and in which:

FIG. 11 is an axial sectional view of the mount as using four shells;

DETAILED DESCRIPTION

Figure 1:
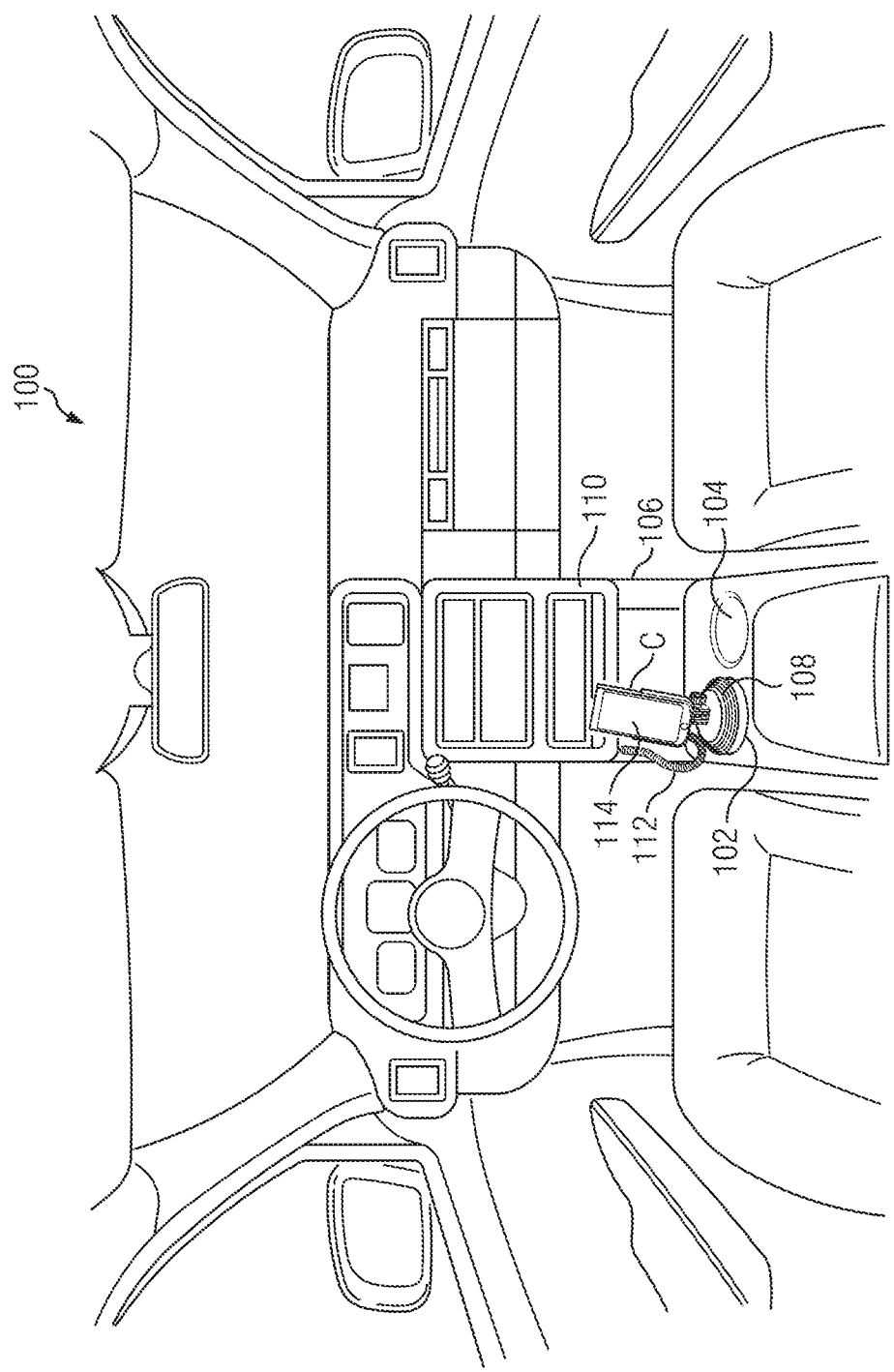
FIG. 1 is a perspective view of a vehicle interior, showing how the invention is deployed.

FIG. 1 shows a typical interior of a vehicle 100 in which two cup holders 102 and 104 are formed in a vehicle center console 106. A cell phone mount 108 according to the invention has been fitted into a driver's side cup holder 102 and a cell phone C is being held by a cell phone mounting bracket of mount 108, described in detail below. The cell phone C may be connected by a power/communications cable 112, such as a firewire cable, to a port in a dashboard 110 of the vehicle 100. The cell phone C has a screen 114, the angle of which may be adjusted by the user for optimum viewing.

While the cell phone mount 108 is shown press-fit into the driver's side cup holder 102, it may be used in any other cup holder within the interior of vehicle 100, of which a passenger's side cup holder 104 is only one example. The mount 108 (or an additional copy thereof) could also be used to mount a cell phone to a cup holder in a second or third row of seats (not shown).

Figure 2:
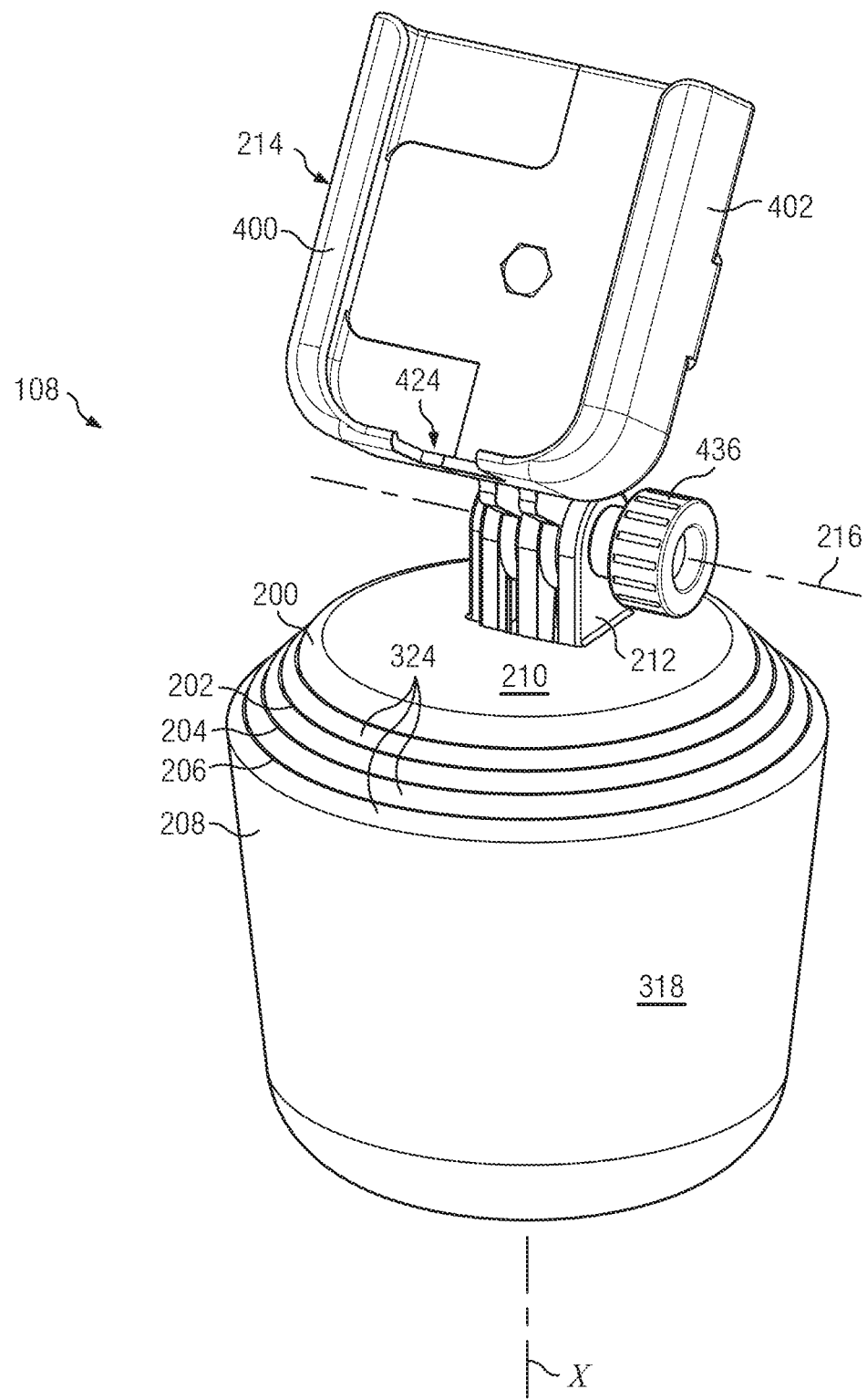
FIG. 2 is an isometric view of the mount as assembled with all of its shells.

One embodiment of the cell phone mount 108 is shown in more detail in FIGS. 2-10. Mount 108 includes a base 200 and a plurality of hollow shells. In the illustrated embodiment, four such hollow shells 202, 204, 206 and 208 are provided, in a range of different, sequentially increasing radial sizes. In other embodiments, more or fewer shells may be provided. FIG. 2 shows a configuration of the cell phone mount 108 in which all of the shells 202-208 have been assembled to base 200. The base 200 has a top 210 with a substantially flat horizontal surface, from which upwardly extends a cell phone mounting bracket pier 212. A cell phone mounting bracket 214 is rotatably affixed to the pier 212 around a horizontal axis 216.

Figure 3:
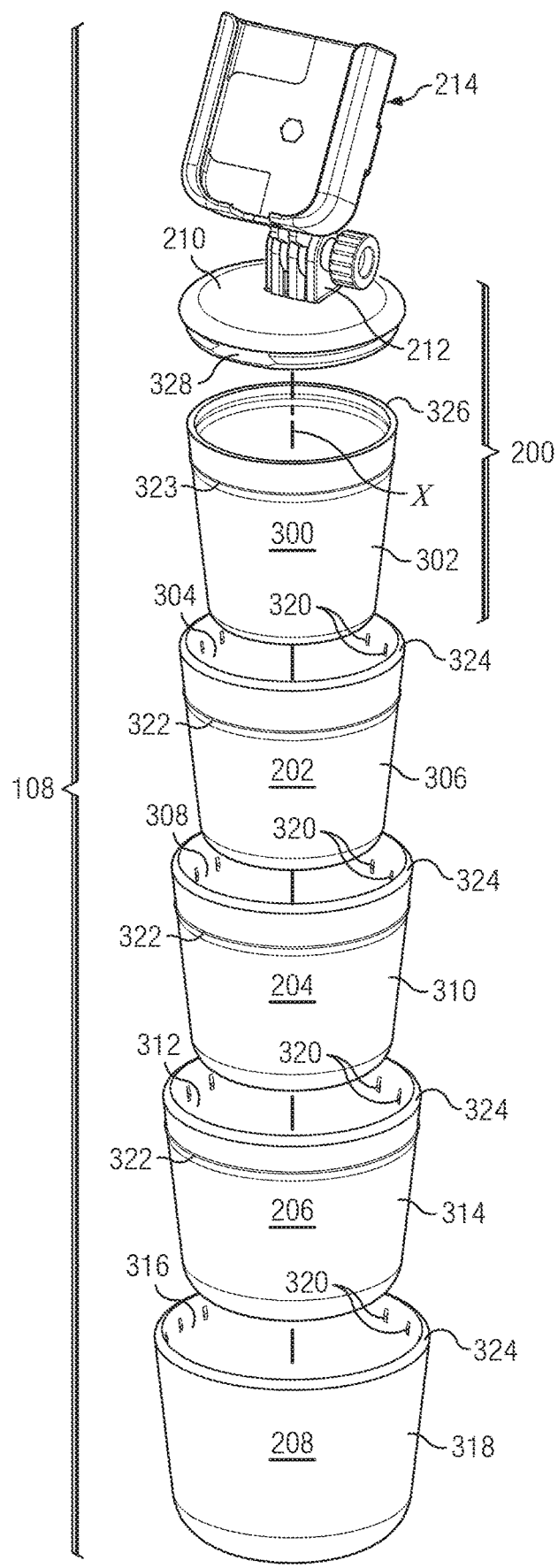
FIG. 3 is an exploded view showing how a mount base and a plurality of shells fit together.

As seen in FIG. 3, the base 200 includes a hollow inner cup 300, to which the base top 210 may be snapped, glued or heat-bonded. Most of the parts of the mount 108 preferably are injection-molded from a tough, resilient plastic, such as ABS or polypropylene. As an aid to moldability, the various plastic components of mount 108 all have relatively thin walls. Hence, inner cup 300 is hollow. In other embodiments, the base 200 could be fabricated or machined as a single piece, or could have a hollow plastic external wall as shown but also a weight (not shown) affixed to or filling its interior.

The base 200 has a first outer surface 302 that in the illustrated embodiment is formed as a surface of rotation around vertical axis X. Surface 302 is at least generally tapered inwardly and downwardly. In the illustrated embodiment, surface 302 is a frustum of a cone, such that an axial section of it shows a straight wall (see, e.g., FIG. 11) although in other embodiments it could be convex or concave. An inner surface 304 of the first shell 202 may be removably affixed to the cup outer surface 302. An outer surface 306 of the first shell 202, opposed to its inner surface 304, is formed as a surface of rotation around axis X and in the illustrated embodiment is frustoconical.

An inner surface 308 of the second shell 204 may be removably affixed to the outer surface 306 of the first shell. The second shell 204 has an opposed, outer surface 310 that preferably is formed as a surface of rotation around axis X and in the illustrated embodiment is frustoconical. An inner surface 312 of the third shell 206 may be releasably affixed to the outer surface 310 of the second shell. The third shell 206 has an outer surface 314, opposed to inner surface 312, which preferably is formed as a surface of rotation around axis X and in the illustrated embodiment is frustoconical. An inner surface 316 of the fourth shell 208 is removably affixable to the outer surface 314 of the third shell 206. The fourth shell 208 has an outer surface 318, opposed to its inner surface 316. The outer surface 318 is preferably formed as a surface of rotation around axis X and in the illustrated embodiment is frustoconical.

In the illustrated embodiment, outer surfaces 306, 310, 314 and 318 all have a similar pitch or degree of taper, which matches the degree of taper of base outer surface 302. In the illustrated embodiment the inner surfaces 304, 308, 312 and 316 have a similar pitch or degree of taper and are substantially frustoconical. This matching of shape and pitch permits the shells to be selectively assembled to the base in "Russian doll" fashion, as the second and each subsequent shell will fit over the shell beneath it.

The degree of taper of the outer surfaces 302, 306, 310, 314 and 318 is chosen to be greater than the degree of taper or pitch of the vehicle cup holders into which they will be press-fit. The pitch of a typical original equipment manufacturer (OEM) vehicle cup holder is in the range of 0 to about 2½ degrees. Therefore, for the best press-fit or wedging effect, the degree of taper for surfaces 302, 306, 310, 314 and 318 is chosen to be in the range of about 3 degrees to about 15 degrees, more preferably in the range of about 3 degrees to about 9 degrees, and most preferably about 6 degrees.

The outer surfaces 302, 306, 310, 314 and 318 may take forms other than the frusta shown. Instead of the taper being at a fixed angle throughout the length of the outer surface, the amount of taper can change from one location on any of these outer surfaces to the next. The degree of taper at a particular point on an outer surface may vary smoothly as a function of the height of the point from the top 200. A smooth, monotonic variance in taper will produce a surface that is convexly or concavely curved.

Figure 18:
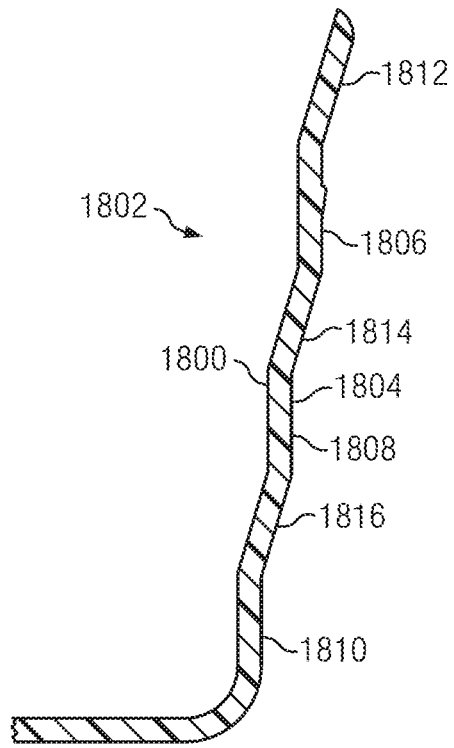
FIG. 18 is an axial sectional detail of an alternative base or shell surface, showing a stepped profile.

Alternatively, any or all of these outer surfaces may be stepped. One stepped embodiment is shown in FIG. 18. A side wall 1800 of a base or shell 1802 has an outer surface 1804 with multiple cylindrical segments 1806, 1808, 1810, smoothly joined by and spaced from each other by frustoconical segments 1812, 1814, 1816. The diameter of each of the cylindrical surface segments 1806, 1808, 1810 are different from each other. The diameters of the cylindrical surface segments 1806, 1808 and 1810 may be chosen so as to be optimally press-fit to the inner side walls of vehicle cup holders in particularly prevalent sizes. For example, cylindrical segment 1808 may have a diameter that is slightly greater than the inner diameter of a side wall of a cup holder known to exist in a popular vehicle model, or range of same.

The illustrated embodiments show base and shell outer surfaces that are formed as surfaces of rotation around a vertical axis. This does not need to be the case. Some vehicle manufacturers are now providing square cup holders, so that they can hold square juice boxes and the like. To fit these, the outer surfaces of the base and shells could have planar facets, orthogonal to a radius drawn from the vertical axis, positioned at 0, 90, 180, and 270 degrees around the vertical axis. The planar facets could be parallel to the axis or alternatively could be sloped after the fashion of a side of an inverted frustopyramid, so that the shell or base could be press-fit to any of a variety of juice box-containing square cup holders.

Means are provided for the inner surface of each hollow shell 202-208 to be removably fastened to the outer surface of the shell or base radially interior to it. In the embodiment illustrated in FIGS. 3, 11, 11A, 13A and 14, these means comprise angularly spaced-apart bumps or protuberances 320 on the shell inner surface that register in or snap into a circumferential groove 322 on the outer surface of the next smaller shell (or, in the case of first shell 202, to an inner groove 323 of inner cup 300). As an example, the protuberances 320 formed on the inner surface 312 of third shell 206 are adapted to snap into groove 322 formed in the outer surface of second shell 204. Each groove 322 is positioned near an upper edge 324 of the shell in question. Circumferential base groove 323 is formed near an upper edge 326 of inner cup 300.

Figure 19:
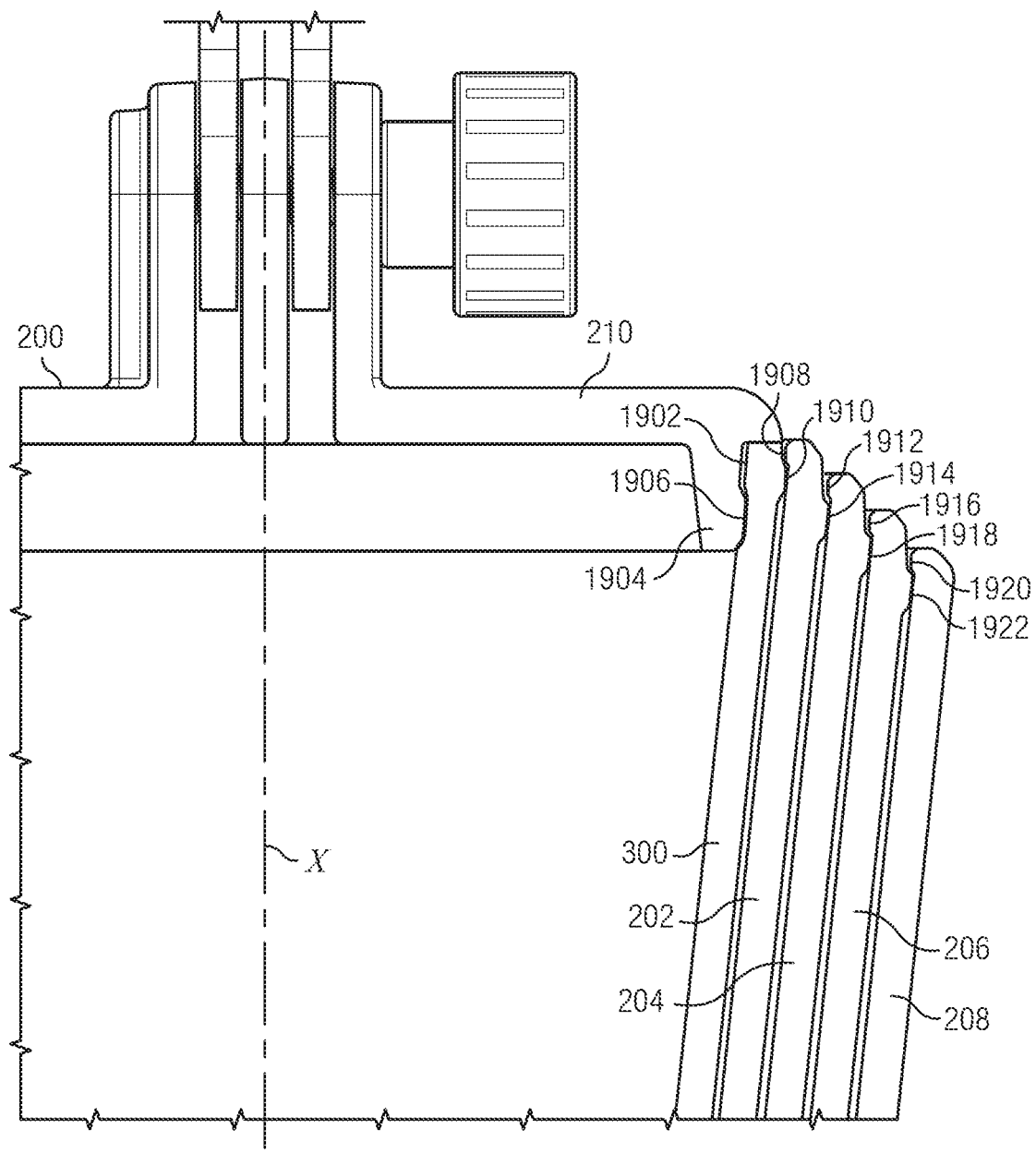
FIG. 19 is an axial sectional detail of a cell phone mount assembly using four shells and showing alternative cup and shell affixation structure.

The removable fastening of a shell to a surface interior to it could also be done by structures alternative to the ones shown, such as the structures shown in FIG. 19. The inside surface 1900 of cup 300 has a continuous, circumferential raised rib 1902. This provides an undercut area from the innermost edge of the rib 1902 towards the bottom of cup 300. Correspondingly, a circumferential depending flange 1904 of the base top 210 has a continuous, circumferential rib 1906 that, when assembled to cup 300, will be underneath the cup rib 1902. As the inside diameter of cup rib 1902 is smaller than the outside diameter of flange rib 1906, the interaction of ribs 1904, 1906 will lock cup 300 to base top 210.

Shells 202-208 have similar interacting pairs of continuous circumferential ribs that releasably affix any particular shell to the cup or shell radially interior to it. An internal circumferential rib 1908 of first shell 202 snaps over an external circumferential rib 1910 of cup 300. An internal circumferential rib 1912 of second shell 204 snaps over an external circumferential rib 1914 of shell 202. An internal circumferential rib 1916 of third shell 206 snaps over an external circumferential rib 1918 of second shell 204. Finally, an internal circumferential rib 1920 of fourth shell 208 snaps over an external circumferential rib 1922 of third shell 206. All of the affixation ribs on cup 300 and shells 202-208 preferably are located near the top end of the cup/shell side walls.

Figure 13:
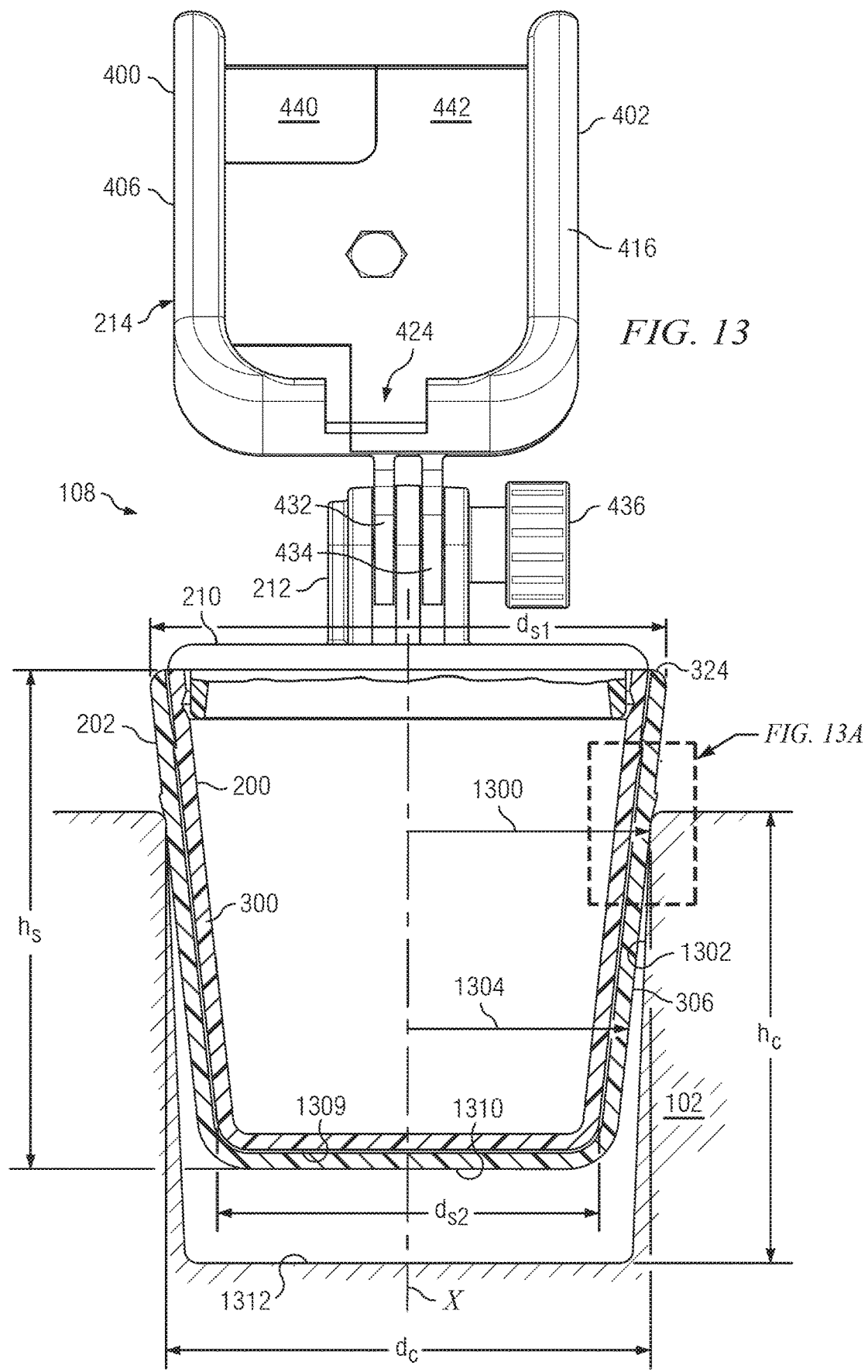
FIG. 13 is an axial sectional view showing how the cell phone mount assembly, as using a single shell, has been press-fit into a representative vehicle cup holder.

Since the outer surfaces of the illustrated inner cup 300 and shells 202-208 have a similar profile (in the illustrated embodiment, they are all linear in axial section), and are all at least generally downwardly and radially inwardly tapered, each of the shells 202-208 will fit to any of a respective predetermined range of cup holder sizes. For example, as seen in FIG. 13, the radius of outer surface 306 of shell 202 linearly decreases as a function of its separation from top edge 324. In the scenario shown in FIG. 13, only the first shell 202 has been assembled to the base 200, and this shell 202 has been found to best fit to the topmost radius of cup holder 102. A radius 1300 from the point on surface 306 abutting the corner or inner wall 1302 of the cup holder 102, to the axis X, is larger than a radius 1304 taken farther down on surface 306. Therefore, as using this shell 202, the assembly will fit cup holders having a side wall radius anywhere inside of this range. Similarly, and as seen in FIG. 11, second shell outer surface 310 has a radius 1100 at a first depth from its upper edge 324, and a second, smaller radius 1102 at a second depth from its upper edge that is larger than the first depth. This means that an assembly in which second shell 204 is the outermost shell will fit to any cup holder having a side wall radius within a predetermined range of such radii including radii 1100 and 1102. In assemblies in which all four shells are employed, the outer surface 318 of fourth shell 208 will be the surface that abuts the inner cylindrical wall of the cup holder. This surface 318 likewise offers a range of radii, including radius 1104 at one locus on surface 318, and smaller radius 1106 at locus on surface 318 that is farther away from top edge 324 of the shell 208. The outer surface 314 of third shell 206 offers a similar range of radii, one of which may optimally fit a particular cup holder.

The ranges in radii from the vertical axis to points on outer surfaces 302, 306, 310, 314 and 318 have a certain overlap from one outer surface to the next. In use, the user preferably selects the base 200, or one of the shells 202-208, which has a fitting radius highest up on the shell/base outer surface, for optimum stability.

Referring particularly to FIG. 13, a vertical height $h_s$ of the base and shell outer surfaces 302, 306, 310, 314 and 318, and minimum and maximum diameters $d_{s2}$ and $d_{s1}$, are chosen such that a bottom 1309 of the base 200, and a bottom 1310 of any of the shells 202-208, won't touch a bottom 1312 of the vehicle cup holder 102. This is to insure that the cell phone mount 108 and the cell phone C will be entirely supported by the cup holder side wall 1302. A frictional or interference engagement of the selected outer surface 302, 306, 310, 314 or 318 with cup holder side wall 1302 will keep the cell phone mount 108 tightly in place and will mitigate against the cell phone mount 108 from coming loose and rattling around in the cup holder 102.

In the illustrated embodiment, the cell phone mount 108 is meant to fit a range of cup holders that covers almost all of the cup holders now found in vehicles. The cup holder diameter $d_c$, measured between opposed interior side walls of the cup holder 102 or between any inwardly extending cup-holding fingers or projections of such a cup holder, has been found to be in the range of about 2.8 to about 3.75 inches. The cup holder depth $h_c$, vertically measured from cup holder top surface 1308 to the bottom surface 1312 of the cup holder 102, has been found to be in the range of about 1.5 to about 3.5 inches. Given these dimensional ranges, the outer surface vertical height $h_s$ of the base and shell outer surfaces should be chosen from the range of about 2 to about 3½ inches. The smallest diameter $d_{s2}$ of outer surface 302 of base 200 should be chosen to be in the range of about 2.39 to about 2.5 inches. The largest diameter $d_{s1}$, taken at the topmost end of the outer shell surface 318 (in FIG. 13, a largest diameter $d_{s1}$ for outer surface 306 of first shell 202 is shown) of the fourth shell 208 should be about 3.93 inches. This permits the cell phone mount to fit any cup holder up to an internal diameter of about 3.875 inches.

With reference to FIGS. 4-9 and 14, the cell phone mounting bracket 214 has a stationary jaw 400 and a movable jaw 402 that moves relative to jaw 400 in either of two directions parallel to axis 216. Jaw 400 has a u-shaped channel 404 that includes an upper segment 406 and a horizontally disposed lower segment 408. Segments 406 and 408 are joined by a curved transition 410. Segment 408 is horizontally disposed and terminates in an inner-facing end 412. Jaw 402 has a u-shaped channel 414 that includes an upper segment 416 and a lower segment 418. Segment 418 is horizontally disposed and terminates in an inner-facing end 420. Segment 418 is joined to segment 416 by a curved transition 422. The upper segment 416 of jaw 402 is parallel to and spaced from upper segment 406 of jaw 400. The spacing between upper segments 406 and 416 is user-selectable such that bracket 214 can accommodate cell phones of different widths.

Figure 4:
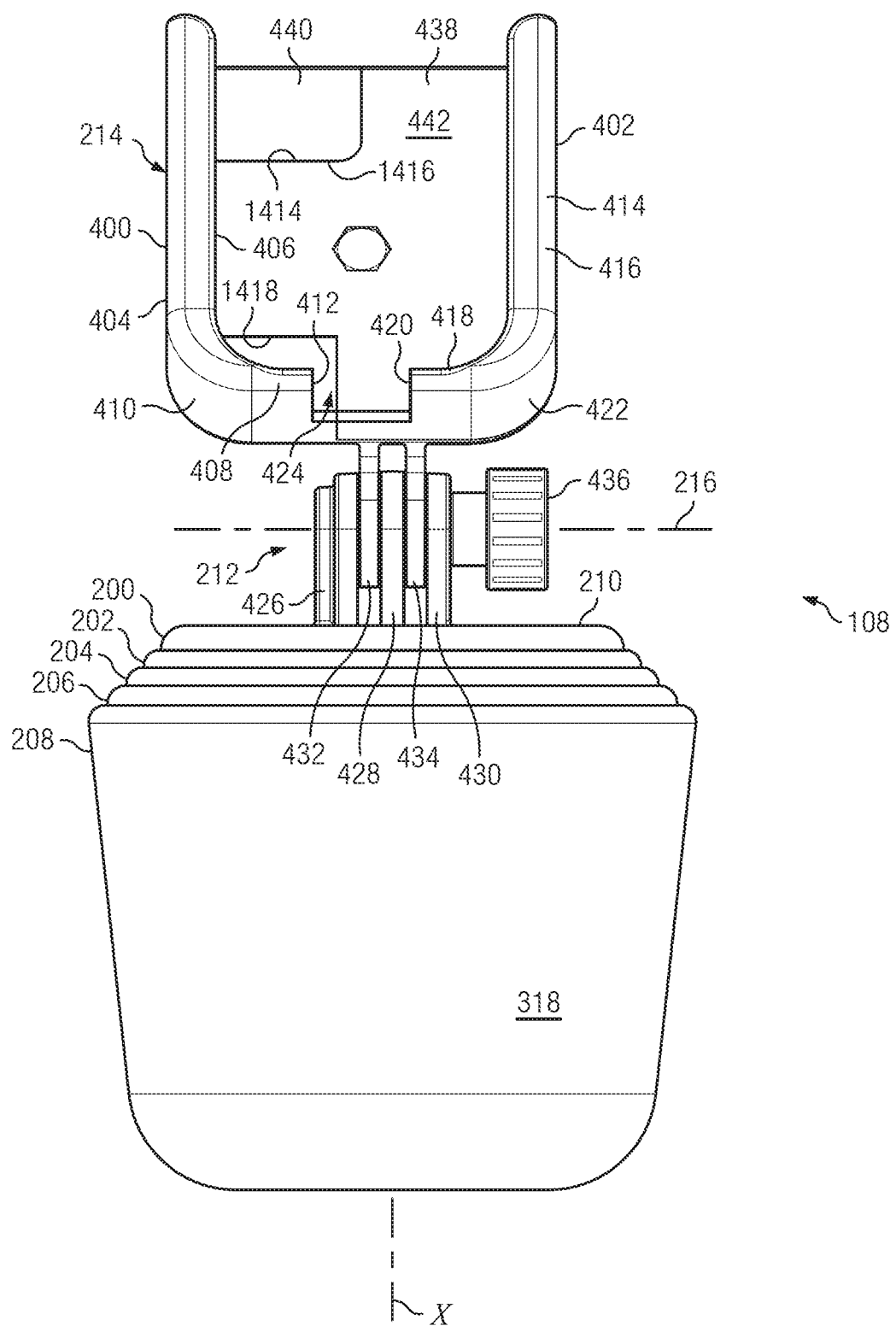
FIG. 4 is a front view of the mount as assembled using all of its shells, and showing cell phone holding jaws in a smallest-width position.
Figure 5:
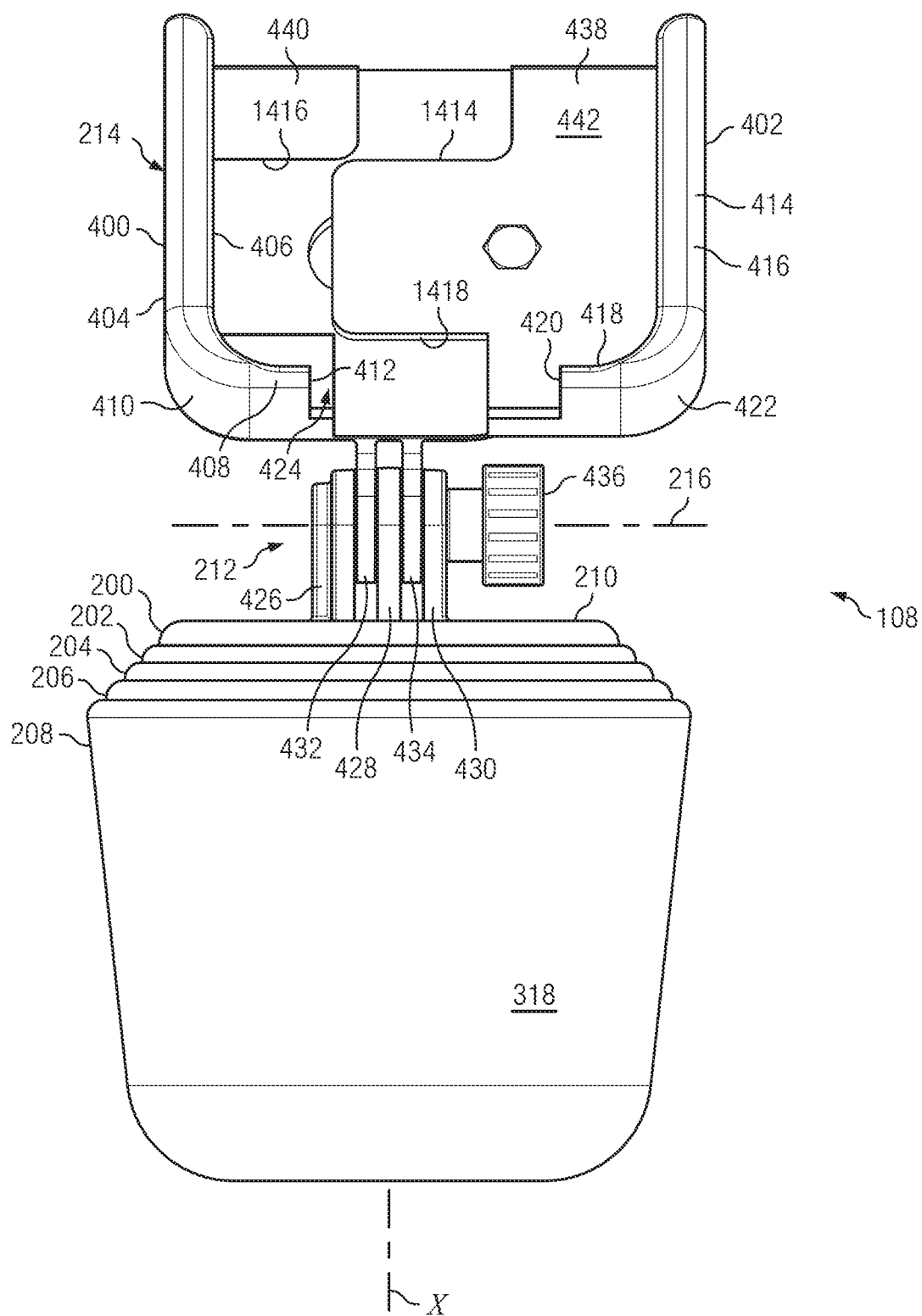
FIG. 5 is a view similar to that shown in FIG. 4, but with the cell phone holding jaws in a largest-width position.
Figure 6:
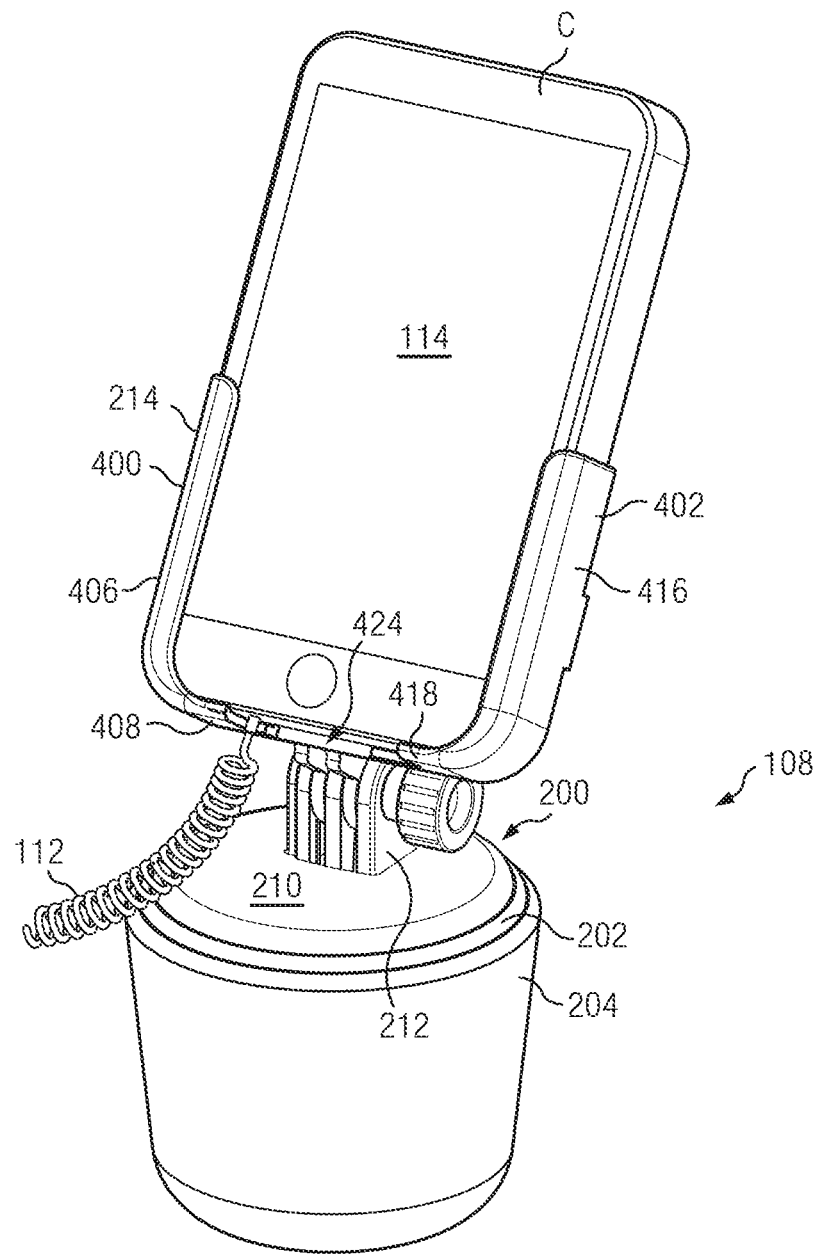
FIG. 6 is a perspective view showing the mount holding a cell phone with a power cord, and as assembled using only two shells.

In FIG. 4, and in FIGS. 7, 9, 10, 12 and 13, the movable jaw 402 is shown in a minimum-width position in which upper segment 416 is closest to upper segment 406, and in which lower segment inner end 420 is closest to lower segment inner end 412. This closed or minimum-width position accommodates cell phones of a small width. Even in this closed position, horizontal channel segment ends 412 and 420 leave a hole or opening 424 for the insertion of a cell phone power and communication cable 112 (see FIG. 6), such as a firewire cable, into a port in the bottom of cell phone C. FIG. 5 is a view similar to FIG. 4, but showing movable jaw 402 at a second or maximum-width position at which its channel upper segment 416 is spaced farthest away from channel upper segment 406. This second position accommodates cell phones of a relatively large width.

Figure 14:
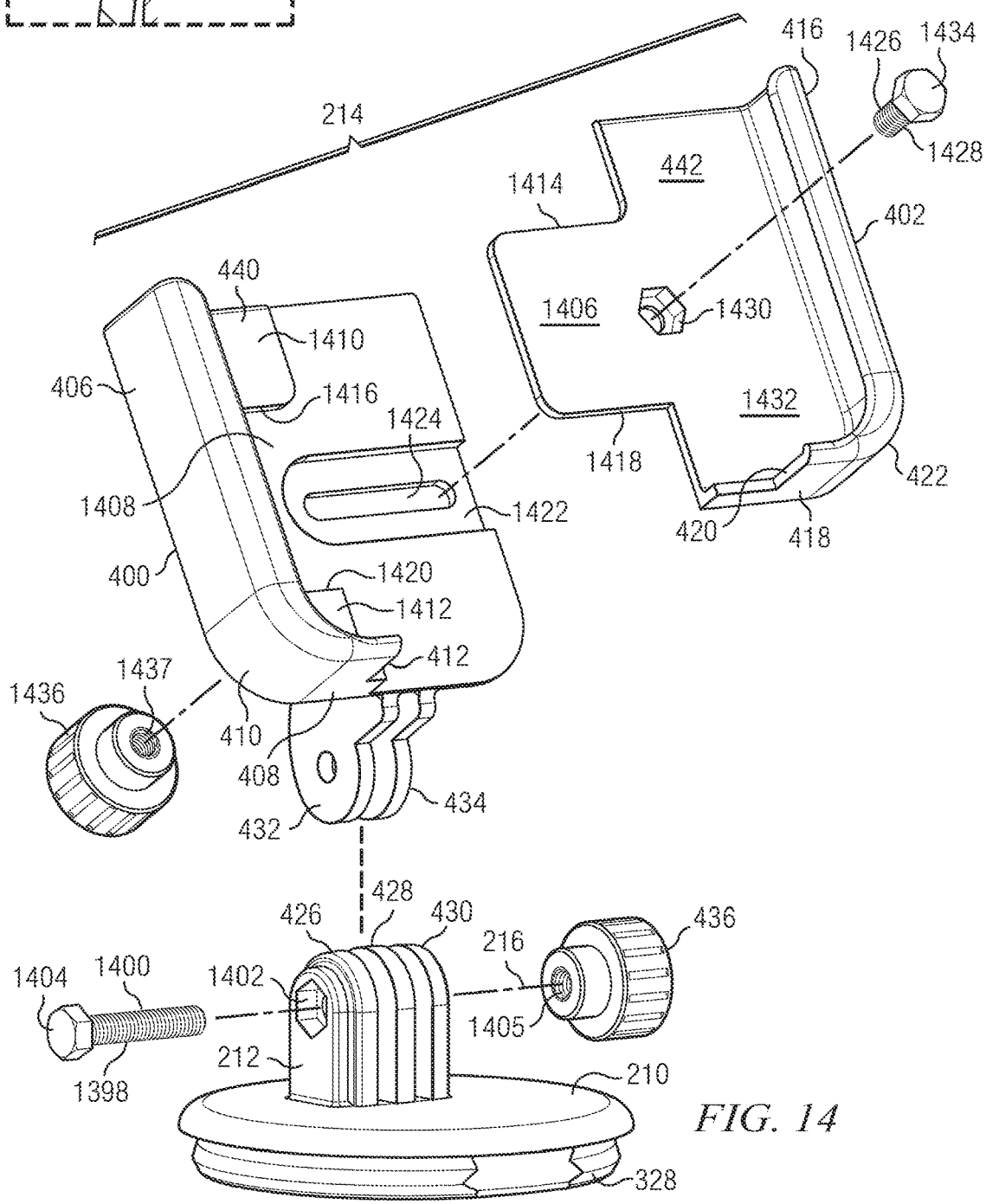
FIG. 14 is an exploded view of the cell phone mount's cap, pier and mounting bracket.
Figure 15:
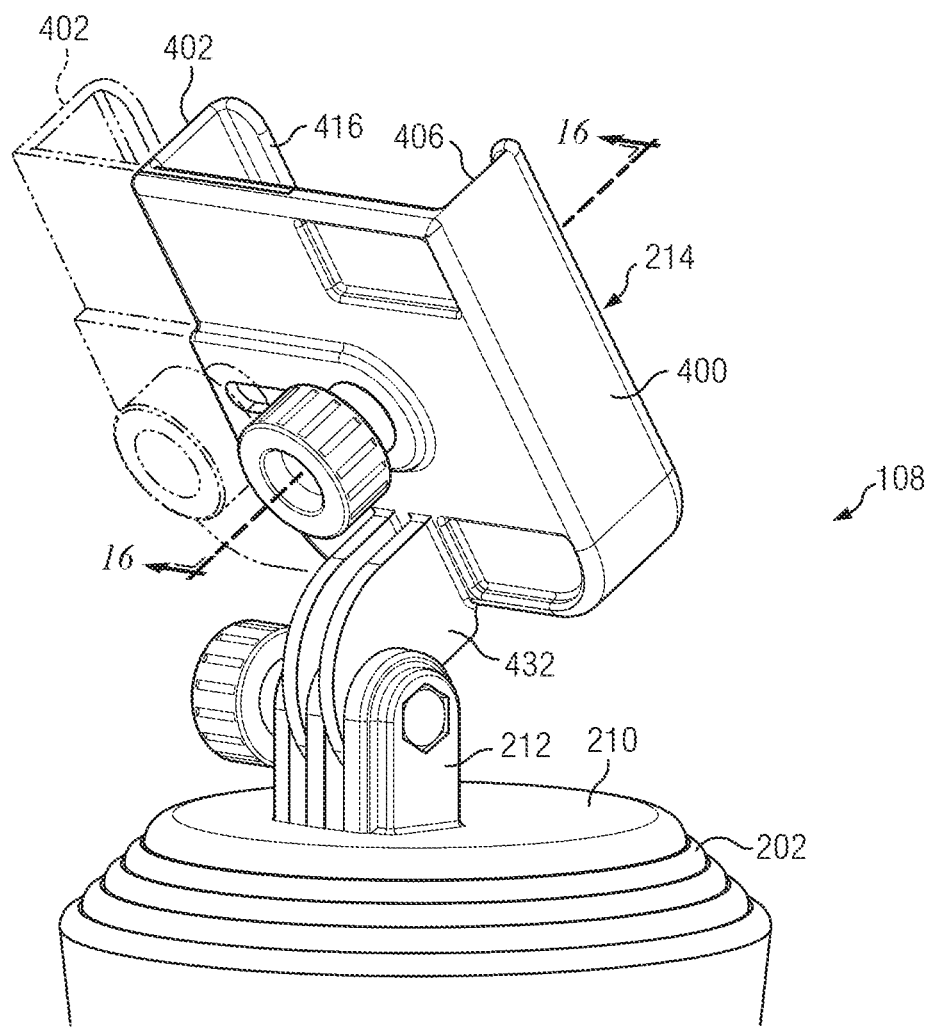
FIG. 15 is a rear perspective view of the cell phone mounting bracket, in which the movable jaw at a smallest-width position is shown in solid line and in which the movable jaw at a greatest-width position is shown in phantom.
Figure 16:
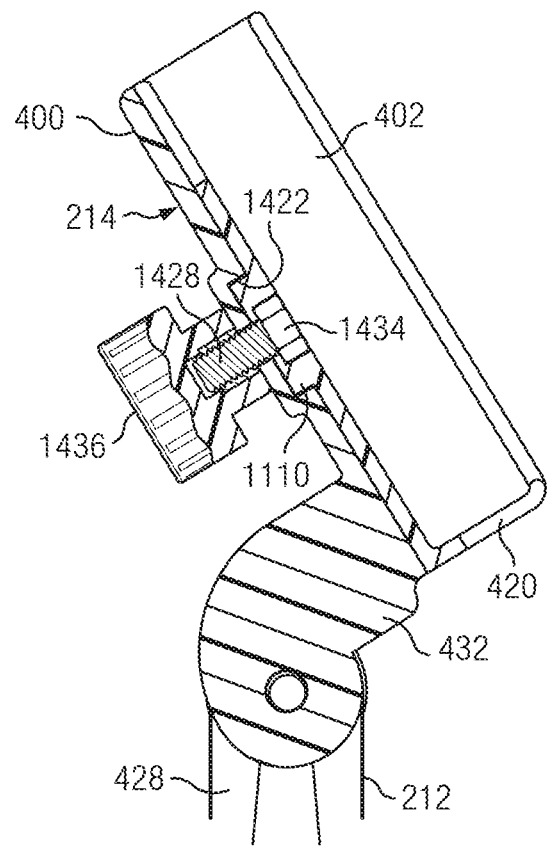
FIG. 16 is a cross-sectional view taken substantially along Line 16-16 of FIG. 15.

In the illustrated embodiment, and as best seen in FIGS. 4, 5, 6, 7, 12, 13, 14 and 15, the pier 212 is made up of three spaced-apart upstanding parallel plates: a left plate 426, a central plate 428 and a right plate 430. These plates are adapted to accept therebetween a downwardly depending left support plate 432 and a right support plate 434 of the cell phone mounting bracket 214. As best seen in FIG. 14, the cell phone support plates 432 and 434 are spaced apart and parallel to each other and are adapted to slidably and closely fit within the spaces between pier plates 426, 428 and 430, which likewise are spaced apart and parallel to each other. In the illustrated embodiment the pier plates 426, 428 and 430 stand up from and are integrally molded with the base top 210. In the illustrated embodiment the support plates 432 and 434 are integrally molded as a part of stationary jaw 400. All of plates 426, 432, 434 and 430 have a bore therethrough that is aligned to axis 216 and which admits a shaft 1398 of a cap screw 1400.

The pier plate 426 has been thickened so as to define a hexagonally shaped opening 1402 that closely receives hex head 1404 of the screw 1400, thereby preventing the threaded shaft 1398 from turning. A fluted knob 436, which may be fabricated with nylon and which may have a threaded metal insert 1405, is threaded onto threaded shaft 1398. Tightening knob 436 will compress plates 432 and 434 against pier plates 426, 428 and 430, fixing in place a mounting bracket back plate 438 relative to axis 216 and controlling one axis of adjustment of the cell phone screen relative to the user.

As best seen in FIG. 11, the central upstanding pier plate 428 does not have a bore therethrough but rather an inverted v-shaped slot 1108. The ceiling of this slot is shaped and sized to receive the shaft 1398 of the cap screw 1400. Alternatively, the v-shaped slot 1108 may be replaced with a bore that accepts screw shaft 1398.

As seen in FIG. 4, the cell phone bracket back plate 438 is composed of a stationary jaw back plate portion 440 and a movable jaw back plate portion 442. As best seen in FIG. 14, movable portion 442 includes a relatively thin, leftward extending tongue 1406 that reciprocates within a shallow and wide slot 1408 defined by stationary back plate shoulder portions 1410 and 1412. An upper edge 1414 of tongue 1406 is parallel to axis 216 and linear, and slides along lower edge 1416 of upper shoulder 1410. Lower edge 1416 of stationary back plate shoulder portion 1410 is linear and is aligned with axis 216. A lower edge 1418 of tongue 1406 is parallel to axis 216 and linear, and slides along upper edge 1420 of stationary back plate shoulder portion 1412, which also is linear and is parallel to axis 216.

Figure 7:
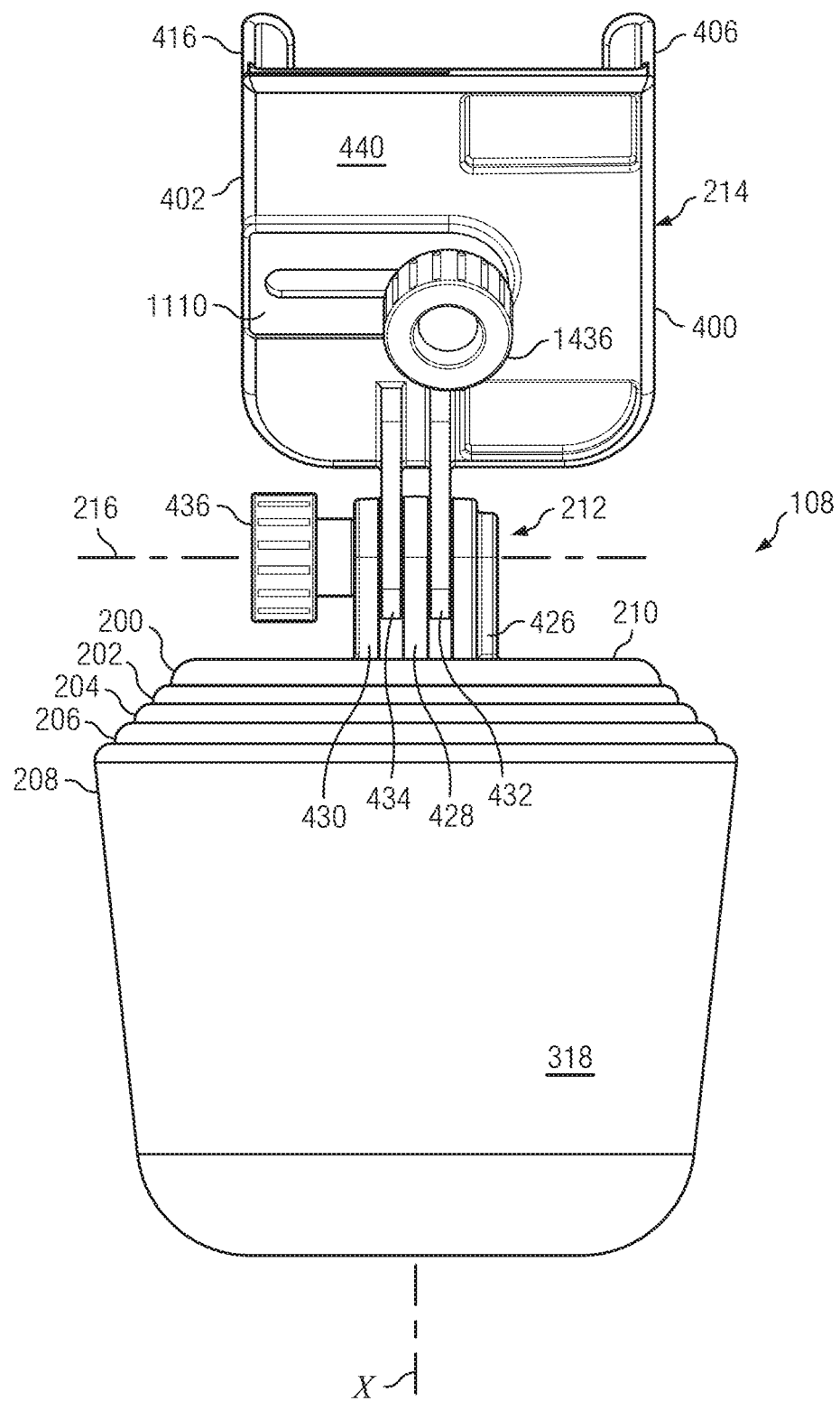
FIG. 7 is a rear view of the embodiment shown in FIGS. 1-6.
Figure 8:
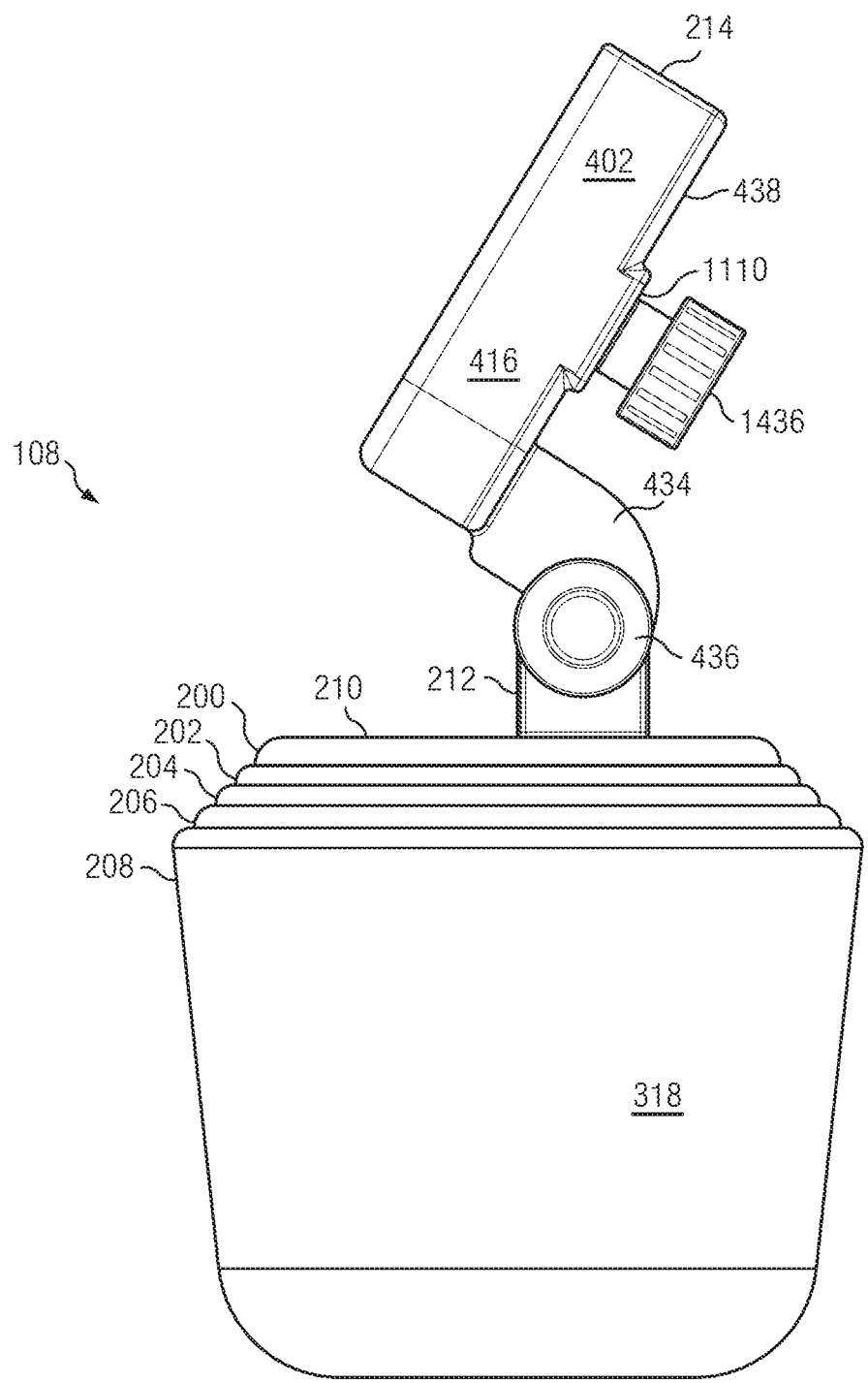
FIG. 8 is a right side view of the embodiment shown in FIGS. 1-7.
Figure 9:
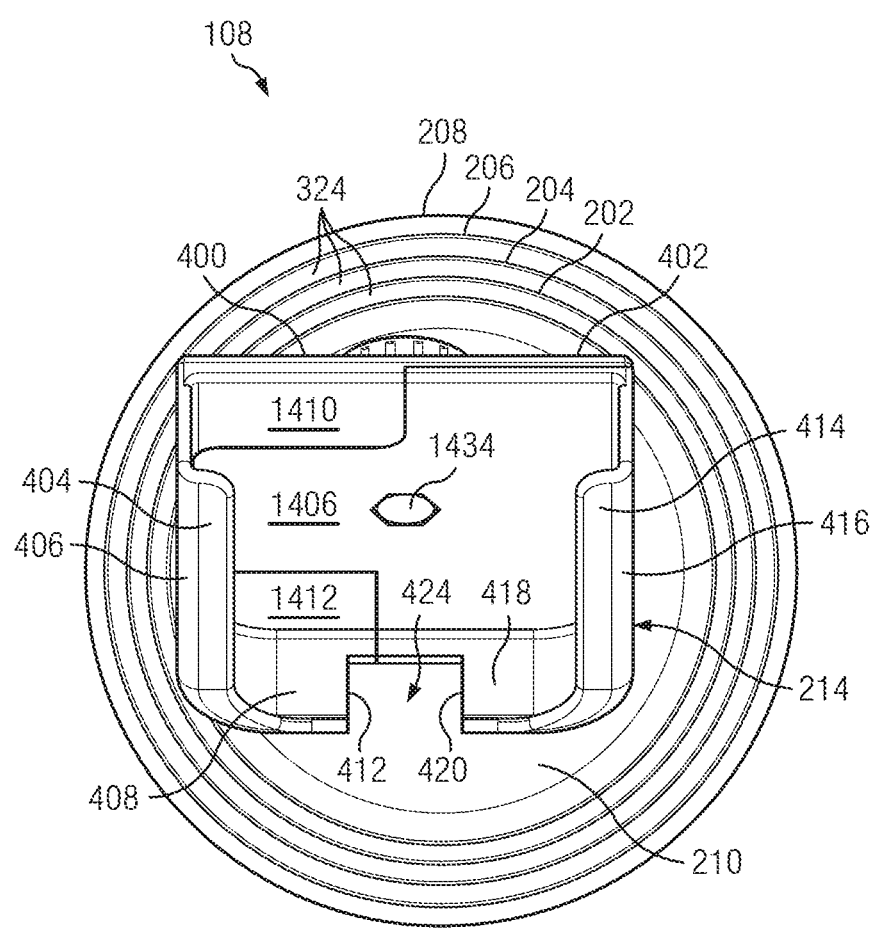
FIG. 9 is a top view of the embodiment shown in FIGS. 1-8.

As seen in FIGS. 7, 11 and 14, the movable jaw 402 has a thickened boss 1110 with horizontal and parallel sides that slide within a depression 1422 (FIG. 14) in the stationary jaw 400. Centered within this depression 1422 is a slot 1424, elongate in a horizontal direction, which slidably receives a shaft 1426 of a cap screw 1428. A hexagonally shaped cavity 1430 is formed in a forward surface 1432 of the movable jaw back plate portion 442, which closely receives a hex head 1434 of the cap screw 1428. This prevents cap screw 1428 from turning. A jaw width adjusting knob 1436 may be formed of nylon with a threaded metal insert 1437 and is threaded onto the shaft 1426. In use, the user slides the movable jaw 402 leftward or rightward relative to stationary jaw 400 to best fit a width of the user's cell phone, then tightens the knob 1436 on threaded shaft 1426 of screw 1428, thereby clamping movable jaw 402 to stationary jaw 400.

Figure 10:
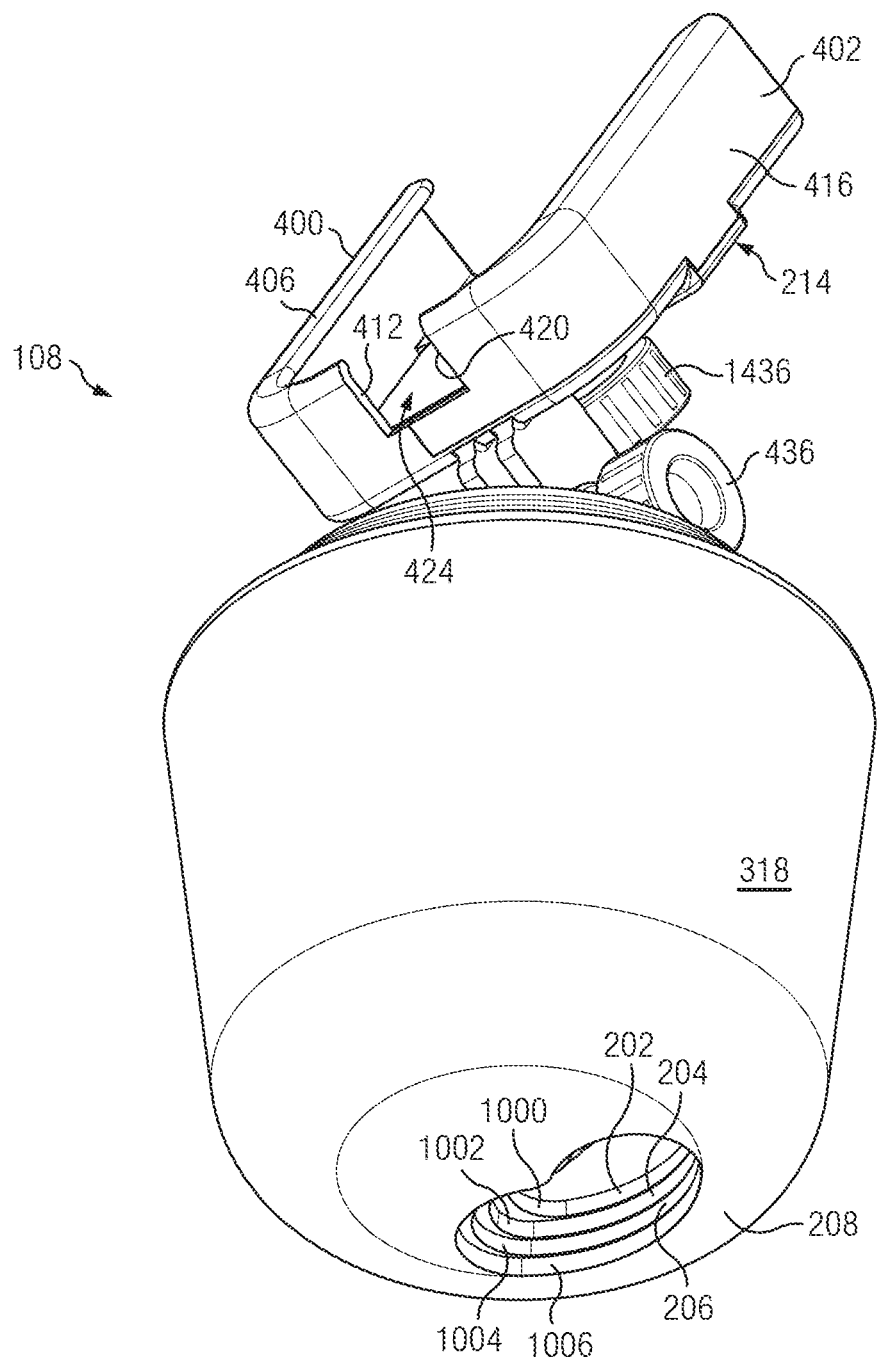
FIG. 10 is a bottom perspective view of the embodiment shown in FIGS. 1-9.

Referring to FIG. 10, the bottom of each hollow shell 202, 204, 206 and 208 is molded with a respective hollow opening 1000, 1002, 1004 or 1006. These openings are clearance holes to allow the user to push apart the individual shells from each other after they have been snapped together. The user can rotate the shells relative to each other to expose more surface area on the shell bottom of the shell to the immediate interior of the one being accessed by its opening 1000-1006, so that the user may push away a selected number of shells from the cup 300 and one or more shells that are to continue to be used in the assembly.

Figure 11A:
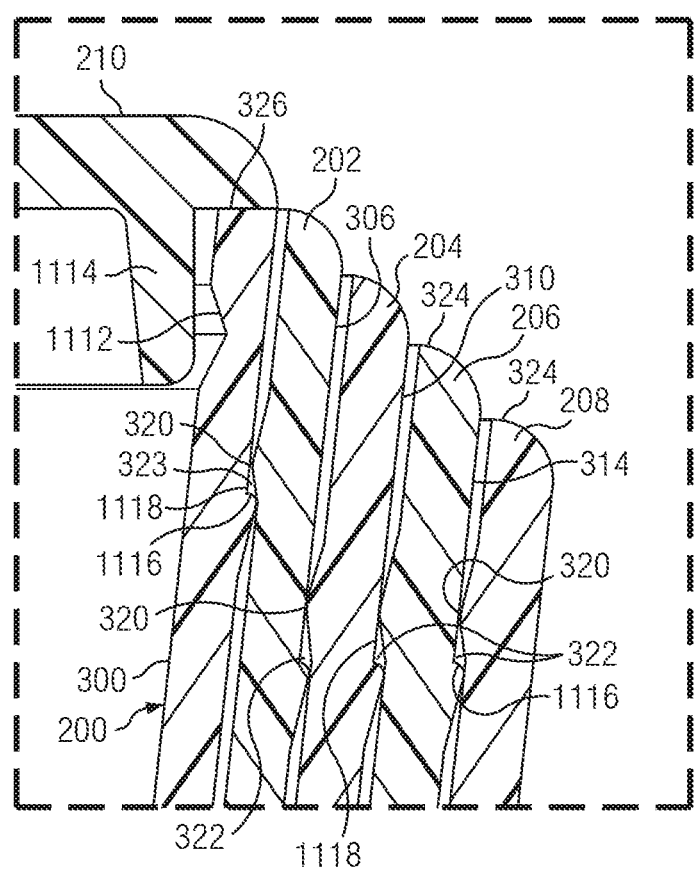
FIG. 11A is a detail of FIG. 11.
Figure 12:
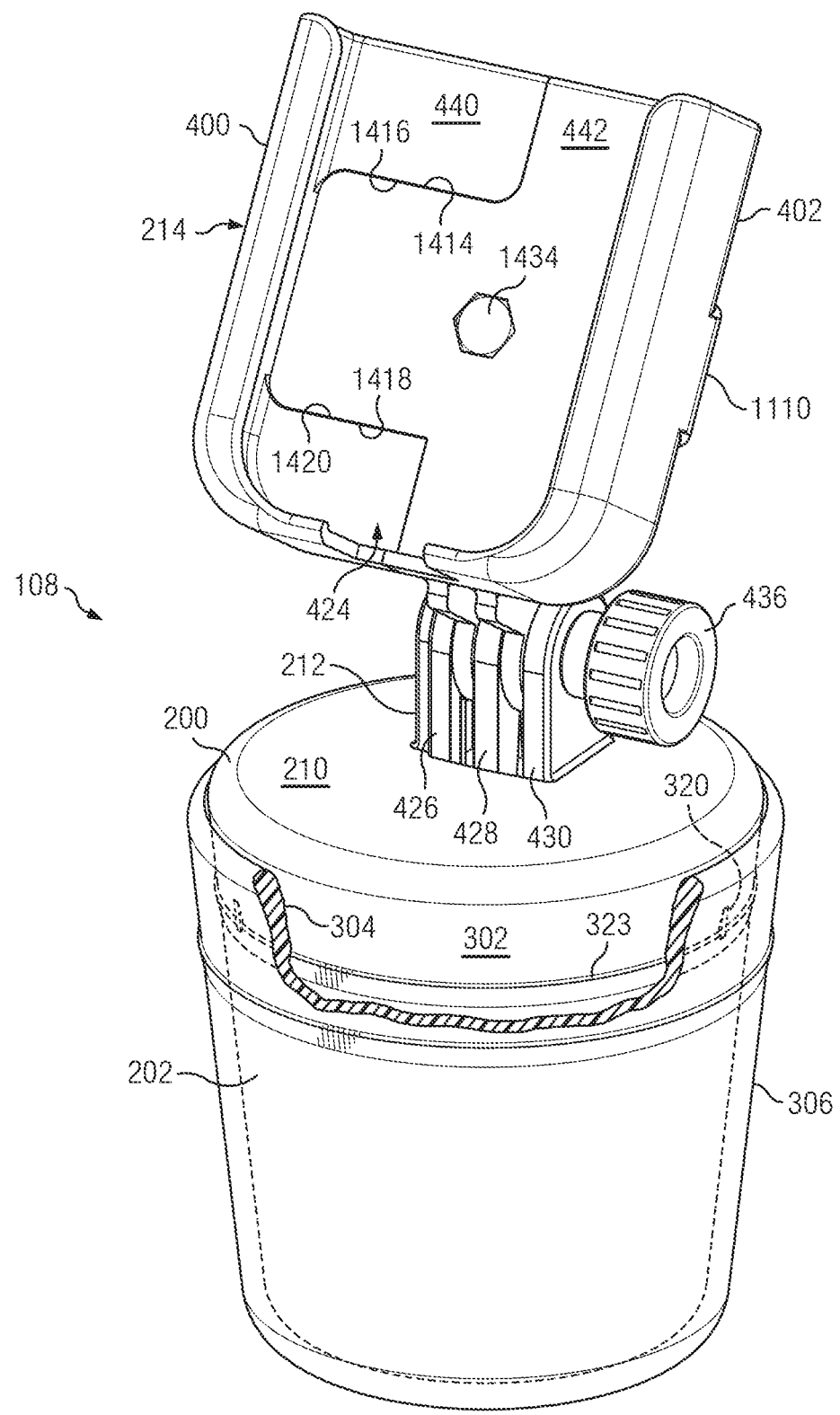
FIG. 12 is a perspective view with parts broken away of a cell phone mount assembly as using only one shell.

FIG. 11A is a detail showing how first shell 202 is releasably secured to base 200, how each shell 204, 206 and 208 may be releasably secured to the shell interior to it, and how cap 210 is permanently affixed to base inner cup 300. The inner cup 300 has a v-shaped circumferential groove 1112 on its inner surface and near its top end 326. This groove 1112 accepts each of a plurality of v-shaped wedges 328 (one shown in FIG. 3) formed to radially outwardly extend from a downwardly depending circumferential flange 1114 (FIG. 11A). The wedges 328 are angularly extensive enough, relative to axis X (FIG. 11), that they are snapped into groove 1112 with considerable downward force and may not thereafter be easily removed. Alternatively or in addition, the top 210 may be joined to the inner cup 300 by gluing or welding.

As shown in FIG. 11A, on its outer surface 302, inner cup 300 has a v-shaped circumferential groove 323 that accepts each of the inwardly extending protuberances 320 of shell 202. Outer surfaces 306, 310 and 314 similarly have v-shaped circumferential grooves 322 that accept the inwardly extending protuberances 320 of the shell respectively immediately radially exterior to them. The morphology of the grooves 323 and 322 is similar. Each has a lower wall 1116 and an upper wall 1118. A taper of upper wall 1118 is a little more than the general taper of the outer base/shell surface of which it is a part, and is downward and inward. A taper of lower wall 1116 is more abrupt than the taper of wall 1118, and is downward and outward. This means that a shell will be relatively easily attachable to the shell or base immediately interior to it, but that it will require more axial force to pull off a shell from an assembly of inner cup 300 and shells (if any) radially interior to it.

Figure 13A:
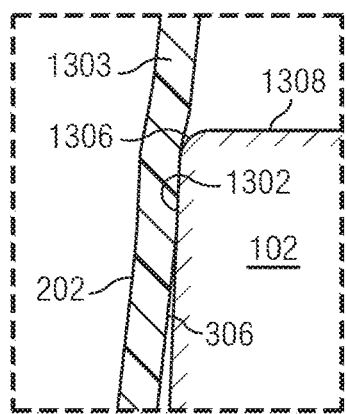
FIG. 13A is an enlarged detail of FIG. 13.

FIG. 13A is a detail of FIG. 13, and shows one possible interaction of a base/shell assembly (here, only shell 202 has been added to the assembly also including base 200) and the cup holder side wall 1302. The draft, pitch or degree of taper of shell or base wall 1303 is chosen to be slightly more than the draft of a typical cup holder 102; surface 306 is more inwardly and downwardly tapered, at least in a general way, than inner wall 1302 of the cup holder 102. This means that the interaction or abutment of the shell or base wall 1303 and the inner cup holder wall 1302 will occur at a top cup holder corner 1306, where the inner cup holder wall 1302 meets a substantially horizontal top surface 1308 of cup holder 102. Since preferably the inner cup 300 and each of the shells 202-208 are molded of a resilient plastic, the shell or base wall 1303 will slightly dimple at its point of contact with the cup holder corner 1306, creating a compressive frictional force between the two so that the cell phone mount 108 doesn't simply slide out of holder 102. A similar interaction will obtain between the inner cup 300 and the cup holder wall 1302, or between the wall of another shell 204, 206 or 208 and the cup holder wall 1302, depending on which (if any) shell is chosen to best fit the cup holder 102.

As used with other cup holders, there could be a deformation of the cup holder side wall 1302 in addition to or instead of shell or base wall 1303. In other embodiments, there could be no deformation of either structure, particularly if the base 200, shells 202-208 and cup holder 102 are constructed of more rigid, less elastic materials.

Figure 17:
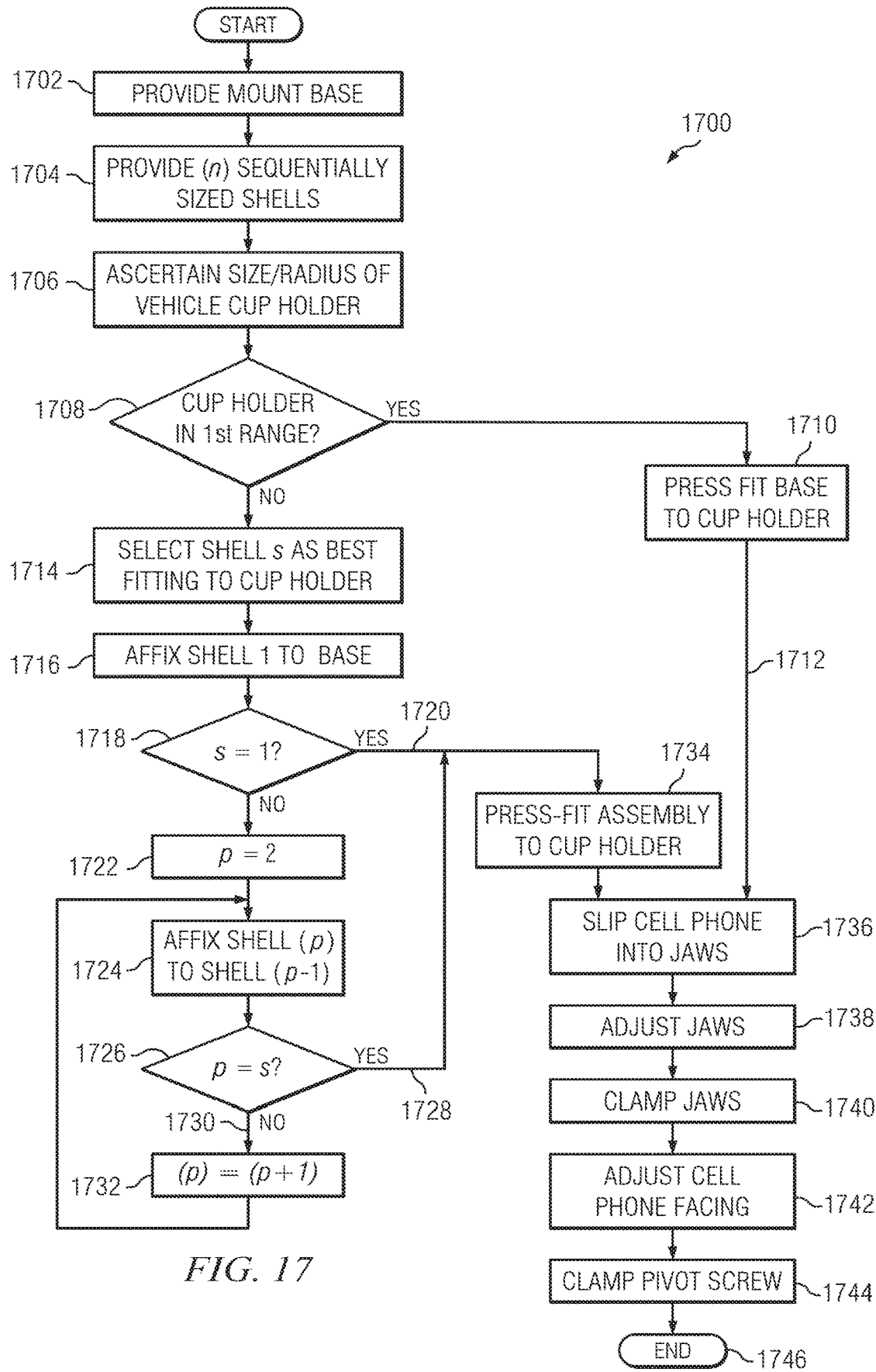
FIG. 17 is a block diagram illustrating a method of using the cell phone mount of the invention.

FIG. 17 depicts a process 1700 for the use of the cell phone mount 108. At beginning step 1702, a cell phone mount base 200 is provided. At step 1704, (n) shells, each of a different radial size, are provided. While in the illustrated embodiment (n)=4, (n) can be chosen to be smaller or larger than this.

At step 1706, the user ascertains the size or radius of the vehicle cup holder. At step 1708, it may be the case that the cup holder 102 has a relatively small radius within a first range and that no shells will be used in mounting the phone C to the cup holder 102. In that case, at 1710, the user press-fits the base 200 to the cup holder 102, and the process proceeds by line 1712 to step 1736. If the cup holder 102 is of a moderate or large size, the process proceeds to step 1714, at which the user selects a shell s as best fitting to the vehicle cup holder inner wall. This may be performed, for example, by a test fitting. Several shells may fit to the cup holder inner wall, but the user should select the shell s that engages the cup holder wall at the highest point on its outer surface.

Next, and at step 1716, the user affixes the first shell 202 to the base 200. At decision step 1718, it is determined whether the first shell 202 is the same as the best-fitting shell s, meaning that only the first shell will be used in the resulting inner cup/shell assembly. If this is the case, the process proceeds by path 1720 to step 1734.

If even more shells will be necessary to best fit to the cup holder 102, then at step 1722 (and in the pseudocode language used in FIG. 17) a variable p is set to 2. Nest, at step 1724, shell p is removably affixed to the shell immediately interior to it, which will be shell (p−1). For example, and in the first iteration, shell 2, or the second shell 204, will get affixed to shell 1, or the first shell 202.

At step 1726, variable p (identifying the shell presently being handled by the user) is compared with variable s (identifying the shell that best fits the cup holder 102). If these are now the same, the assembly is complete and the process proceeds by line 1728 to step 1734. If shell s has not yet been added to the assembly, then the process branches at line 1730 and p is incremented by 1 at step 1732. The process then loops back to step 1724, at which another shell is added to the assembly. This loop iterates until the current shell p is the same as the best-fitting shell s.

At step 1734, the user has built an assembly that will include base 200 and one or more of the shells 202-208 (or more, in embodiments providing more than four shells). This assembly is then press-fit into the cup holder, to assume a disposition as shown in FIGS. 11 and 11A.

At step 1736, a cell phone C, possibly with a power/communications cord 112 attached (see FIG. 6) is slipped into the open top end of the cell phone mounting bracket 214. Then, at step 1738, the user adjusts the horizontal position of movable jaw 402 until jaw 402 and jaw 400 closely hold the vertical sides of cell phone C. Once the position of jaw 402 has been optimally adjusted, at step 1740 the user twists knob 1436 to clamp jaw 402 to jaw 400.

At step 1742, the user adjusts the screen of the cell phone so that it is pointed in an optimum direction. To adjust the plane of the cell phone screen relative to vertical axis X, the user simply twists the cell phone mount/assembly 108 around axis X in the cup holder in which it has been installed (e.g. cup holder 102). To adjust the plane of the cell phone screen relative to the horizontal, the user pivots bracket support plates 432 and 434 around axis 216 relative to pier 212. Once the desired position has been achieved, the user tightens the pivot screw knob at 1744. The mounting process ends at 1746.

Once the cell phone mount 108 has been installed in a cup holder, adjusted for a particular cell phone and adjusted to optimize the direction in which the cell phone screen faces, it can be left in this condition. The user may at any time slip his or her cell phone into mount 108, and then later easily remove the cell phone from mount 108 through the open top of bracket 214. The u-shaped cord opening 424, since it is open at its top as well, permits the cell phone and cord to be extracted and installed as a unit without disconnecting the power/communications cord 112.

In summary, a new vehicle cup holder cell phone mount has been illustrated and described. The mount is provided as a kit with a plurality of shells, which are built up "Russian doll" fashion on a base until a fit to a given vehicle cup holder is achieved. The base and shells of the mount provide a set of downwardly and inwardly tapered surfaces, one of which will optimally and frictionally engage with an inner side wall of the vehicle cup holder into which the mount is to be installed. A movable jaw allows easy adjustment to a particular cell phone width and the open tops of the cell phone bracket and the cord channel permit easy insertion and extraction of the cell phone and power cord as a unit.

While illustrated embodiments of the present invention have been described and illustrated in the appended drawings, the present invention is not limited thereto but only by the scope and spirit of the appended claims.

We claim:

1. Apparatus for mounting a cell phone to a vehicle cup holder, the apparatus comprising:
a base, a first outer surface of the base formed as a surface of rotation around an axis and being tapered downwardly and radially inwardly;
a top lid forming a top of the base, the top lid having a top surface;
a mounting pier upwardly extending from the top surface of the base;
a cell phone mounting bracket rotatably affixed to the mounting pier and having first and second jaws, the first jaw having a first u-shaped channel with a first upper segment and the second jaw having a second u-shaped channel with a second upper segment disposed in parallel to the first upper segment, the second jaw movable in respect of the first jaw so that a width, taken perpendicularly to the axis, between the first upper segment and the second upper segment, may be selectable by a user so as to fit a width of a cell phone received by the cell phone mounting bracket, means for affixing the second jaw to the first jaw in any of a plurality of positions;
the first u-shaped channel further having a first lower segment and the second u-shaped channel further having a second lower segment, the first and second lower segments being aligned with each other and disposed in a plane perpendicular to the base axis, the first and second lower segments adapted to hold a lower end of the cell phone.

2. The apparatus of claim 1, wherein the first lower segment has a first inner end and the second lower segment has a second inner end facing the first inner end, the plurality of positions including a first position in which the first upper segment is spaced from the second upper segment by a first width and a second position in which the first upper segment is spaced from the second upper segment by a second width that is less than the first width, the second width being the smallest width at which the second jaw can be affixed to the first jaw, the first inner end and the second inner end, when the second jaw is affixed to the first jaw in the second position, defining an access hole therebetween for a cell phone power cable.

3. The apparatus of claim 1, wherein the cell phone mounting bracket has a back plate adapted to support a back of the cell phone, the back plate being comprised of a first back plate portion extending from the first upper segment of the first u-shaped channel toward the second upper segment of the second u-shaped channel and a second back plate portion extending from the second upper segment of the second u-shaped channel toward the first upper segment of the first u-shaped channel, the second back plate portion being in sliding engagement with the first back plate portion and having a bore, the first back plate portion having a horizontally elongate slot;
wherein the means for affixing the second jaw to the first jaw comprises a clamping screw, a shaft of the clamping screw inserted through the bore in the second back plate portion and through the slot in the first back plate portion.

4. The apparatus of claim 1, wherein the mounting pier comprises a plurality of spaced-apart, parallel pier plates extending upwardly from the top surface of the base, the pier plates defining a plurality of pier plate spaces therebetween;
a plurality of spaced-apart parallel support plates downwardly depending from the first jaw of the cell phone mounting bracket, each support plate rotatably received in a respective pier plate space; and wherein
a horizontal passage is formed through each of the pier plates and each of the support plates, a clamping screw adapted for clamping the support plates to the pier plates, a shaft of the clamping screw inserted through each of the pier plates and each of the support plates along the horizontal passage, the clamping screw operable to assume an unclamped configuration and a clamping configuration, the clamping screw permitting the rotation of the support plates relative to the pier plates when the clamping screw is in the unclamped configuration, the clamping screw clamping the pier plates to the support plates when the clamping screw is in the clamping configuration.

5. A method for mounting a cell phone to a substantially cylindrical vehicle cup holder having a radius, the method comprising the steps of:
affixing a cell phone mounting bracket to a top of a base, the base formed around an axis and having a first outer surface which is downwardly and inwardly tapered;
providing (n) hollow, sequentially sized shells, each shell each being of a size that is different from any of the remaining ones of the (n) shells, (n) being an integer greater than or equal to 2, the hollow shells including at least first and second shells, each shell having an inner surface and having an outer surface formed as a surface of rotation around the axis, the respective outer surfaces of the shells being downwardly and inwardly tapered, the inner surface of a first shell of the (n) shells affixable to the first outer surface of the base, the inner surface of the (m+1)th shell being affixable to the outer surface of the (m)th shell, m being any of a range of integers between 2 and n, inclusive;
ascertaining a radius of the vehicle cup holder;
if the radius of the vehicle cup holder falls within a first predetermined range, press-fitting the first outer surface of the base to an inner wall of the vehicle cup holder;
if the radius of the vehicle cup holder is greater than the first predetermined range:
selecting one of then shells whose outer surface has a range of radii from the axis that includes a radius that best matches the radius of the cup holder, the selected shell being the sth shell, s being a value between 1 and n;
affixing the inner surface of the first shell to the outer surface of the base;
if the first shell is the sth shell, press-fitting the outer surface of the first shell to the inner wall of the vehicle cup holder;
if the first shell is not the sth shell, then, for each of p shells, 2≤p≤s, affixing the inner surface of the pth shell to the outer surface of the (p-1th) shell, incrementing p, and repeating the last said step of affixing, until p=s;
if s is greater than 1, press-fitting the outer surface of the sth shell to the inner wall of the vehicle cup holder; and
mounting the cell phone to the cell phone mounting bracket.

6. The method of claim 5, further including the steps of:
ascertaining a width of the cell phone;
adjusting a spacing of a second jaw of the cell phone mounting bracket relative to a first jaw of the cell phone mounting bracket so that the cell phone slidably fits into the cell phone mounting bracket; and
affixing the second jaw of the cell phone mounting bracket to the first jaw of the cell phone mounting bracket.

\* \* \* \* \*